(12) United States Patent
Gotmukle et al.

(10) Patent No.: US 12,258,514 B2
(45) Date of Patent: *Mar. 25, 2025

(54) NON-GREASING LUBRICANT FOR HIGH SALINITY FLUIDS

(71) Applicant: Halliburton Energy Services, Inc., Houston, TX (US)

(72) Inventors: Sharad Bhimrao Gotmukle, Pune (IN); Nivika Rajendra Gupta, Pune (IN); Mahesh Vijay Biyani, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,951

(22) Filed: Apr. 25, 2023

(65) Prior Publication Data

US 2024/0360353 A1    Oct. 31, 2024

(51) Int. Cl.
| | |
|---|---|
| *C09K 8/20* | (2006.01) |
| *C09K 8/24* | (2006.01) |
| *C10M 105/34* | (2006.01) |
| *C10M 129/68* | (2006.01) |

(Continued)

(52) U.S. Cl.
CPC ............... *C09K 8/20* (2013.01); *C09K 8/24* (2013.01); *C10M 105/34* (2013.01); *C10M 129/68* (2013.01); *C10M 145/24* (2013.01); *C09K 2208/34* (2013.01); *C10M 2207/28* (2013.01);

(Continued)

(58) Field of Classification Search
CPC ........ C09K 8/20; C09K 8/24; C09K 2208/34; C10N 2030/22

See application file for complete search history.

(56) References Cited

U.S. PATENT DOCUMENTS

| | | | | |
|---|---|---|---|---|
| 5,961,736 | A | * | 10/1999 | Borah .................. C11D 3/0042 134/28 |
| 6,750,180 | B1 | | 6/2004 | Argillier et al. |
| 7,231,976 | B2 | | 6/2007 | Berry et al. |

(Continued)

FOREIGN PATENT DOCUMENTS

| | | |
|---|---|---|
| EP | 0713909 A1 | 5/1996 |
| EP | 3567091 A1 | 11/2019 |
| WO | 2017176244 A1 | 10/2017 |

OTHER PUBLICATIONS

Product datasheet of Tween80 by Sigma/Aldrich. (Year: 1996).*

(Continued)

*Primary Examiner* — Aiqun Li
(74) *Attorney, Agent, or Firm* — Conley Rose, P.C.; Rodney B. Carroll

(57) ABSTRACT

A lubricant composition containing a vegetable oil, a degreasing agent, and a non-ionic surfactant. The vegetable oil may be soybean oil, the degreasing agent may be ethyl lactate, and the non-ionic surfactant may comprise sorbitan esters, polyethoxylated sorbitan esters, or a combination thereof. Also provided is a wellbore servicing fluid containing a base fluid and the lubricant composition containing vegetable oil, degreasing agent, and non-ionic surfactant. Methods of introducing the lubricant composition and wellbore servicing fluids containing the lubricant composition into a subterranean zone (e.g., into a wellbore disposed in a subterranean formation) are also provided.

20 Claims, 6 Drawing Sheets

(51) Int. Cl.
*C10M 145/24* (2006.01)
*C10N 30/00* (2006.01)

(52) U.S. Cl.
CPC . *C10M 2207/401* (2013.01); *C10M 2209/103* (2013.01); *C10N 2030/22* (2020.05)

(56) References Cited

U.S. PATENT DOCUMENTS

| | | |
|---|---|---|
| 10,240,112 B2 | 3/2019 | Baseeth |
| 10,384,178 B2 | 8/2019 | Baseeth et al. |
| 10,662,363 B2 | 5/2020 | Al-Yami et al. |
| 2009/0057617 A1 | 5/2009 | Leinweber et al. |
| 2012/0202726 A1 | 8/2012 | Barton et al. |
| 2014/0113843 A1 | 4/2014 | Shumway |
| 2015/0007995 A1 | 1/2015 | Livescu et al. |
| 2016/0002521 A1 | 1/2016 | Dillon et al. |
| 2016/0002522 A1 | 1/2016 | Gaertner et al. |
| 2017/0191008 A1 | 7/2017 | Baseeth |
| 2020/0157402 A1 | 5/2020 | Santos et al. |
| 2020/0340302 A1 | 10/2020 | Bomidi |
| 2021/0179910 A1 | 6/2021 | Ghosh et al. |
| 2021/0292675 A1 | 7/2021 | Lewis et al. |
| 2022/0267693 A1 | 8/2022 | Amanullah et al. |

OTHER PUBLICATIONS

Office Action dated Mar. 14, 2023 (19 pages), U.S. Appl. No. 17/751,831, filed May 24, 2022.

Micich, T.J., Soap-based detergent formulations: XIX. Amphoteric Alkylsuccinamide Derivatives as Lime Soap Dispersants. Journal of America Oil Chemists' Society, Mar. 1977. pp. 91-94, vol. 54.

Linfield, W.M. Soap and Lime Soap Dispersants. Journal of American Oil Chemists' Society, Jan. 1978. pp. 87-92, vol. 55.

Foreign Communication from Related Application - International Search Report and Written Opinion of the International Searching Authority, International Application No. PCT/US2024/020646, dated Jul. 17, 2024, 10 pages.

* cited by examiner

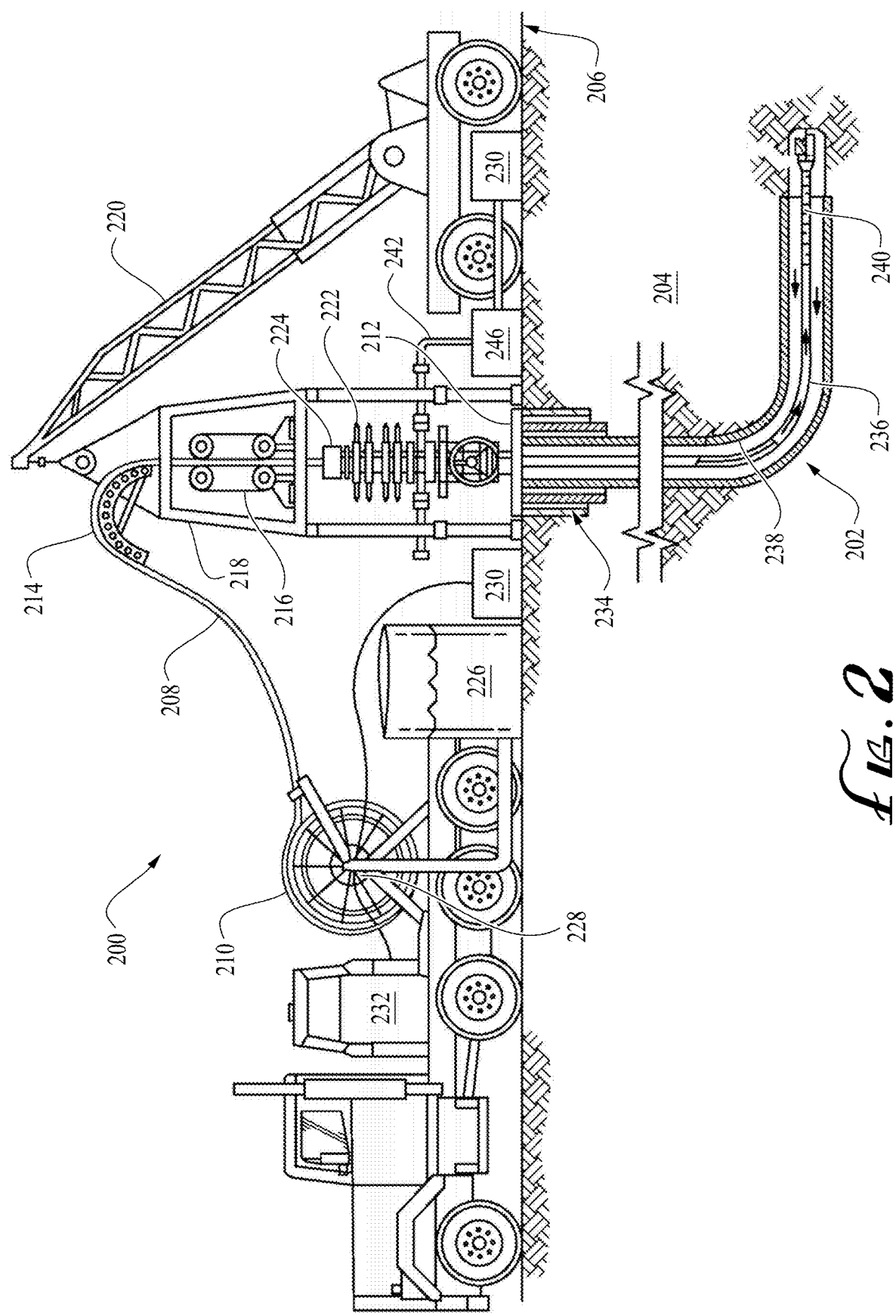

CONTROL 1 — CHEESE LAYER

SAMPLE 1 — NO CHEESE FORMATION

SAMPLE 2

SAMPLE 3

NON-GREASING LUBRICANT FOR HIGH SALINITY FLUIDS

FIELD

The present disclosure relates generally to components of wellbore fluids. Still more specifically, this disclosure provides a lubricant, wellbore fluids comprising said lubricant, and methods of treating a wellbore utilizing such lubricants and wellbore fluids. Still more specifically, this disclosure provides a lubricant composition suitable for use with water-based and oil based wellbore fluids, such as those utilized as drilling muds to drill subterranean wells, as completions fluids during completions of subterranean wells, and as coiled tubing fluids such as lubricants utilized during coiled tubing placement or wellbore fluids introduced downhole via such coiled tubing.

BACKGROUND

Hydrocarbons, such as oil and gas, residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. For example, drilling fluids or muds are commonly circulated in the well during such drilling to cool and lubricate the drilling apparatus, lift cuttings out of the wellbore, and counterbalance the subterranean formation pressure encountered.

An important function of drilling fluid is to reduce the considerable torque on the rotating drill stem caused by the friction between the outside of the drill pipe comprising the drill stem and the wall of the well and/or casing strings. Drilling through offsets and highly deviated or horizontal wells results in increased frictional forces, increasing the demand on the lubricating properties of the drilling fluids. If the lubricating properties of the drilling fluids are not sufficient and the drill pipe encounters excessive torque, drilling may be interrupted by costly delays. Increased lubricity is also often desired during wellbore cleanup and completions, coil tubing operations, wireline operations, and the running of production tubulars.

For example, brines have been utilized for decades for well drilling and completions. High density brines have been found to have particular applicability for use in deep wells. While high density brines have been found sufficient in providing the lubricity and viscosity of a wellbore servicing fluid under extreme shear, pressure and temperature variances, such brines may prove ineffective if unable to exhibit the constant lubricity required during high shear conditions.

Therefore, an ongoing need exists for a lubricant composition able to maintain lubricity, for example in a wellbore servicing fluid, under a variety of conditions.

BRIEF DESCRIPTION OF DRAWINGS

For a more complete understanding of this disclosure, reference is now made to the following brief description, taken in connection with the accompanying drawings and detailed description, wherein like reference numerals represent like parts. The following figures are included to illustrate certain aspects of the present disclosure, and should not be viewed as exclusive embodiments. The subject matter disclosed is capable of considerable modification, alteration, and equivalents in form and function, as will occur to one having ordinary skill in the art and having the benefit of this disclosure.

FIG. 2 depicts a schematic of a coiled tubing wellbore servicing environment in which the lubricant composition described herein may be utilized, according to embodiments of this disclosure;

DETAILED DESCRIPTION

Figure 1:
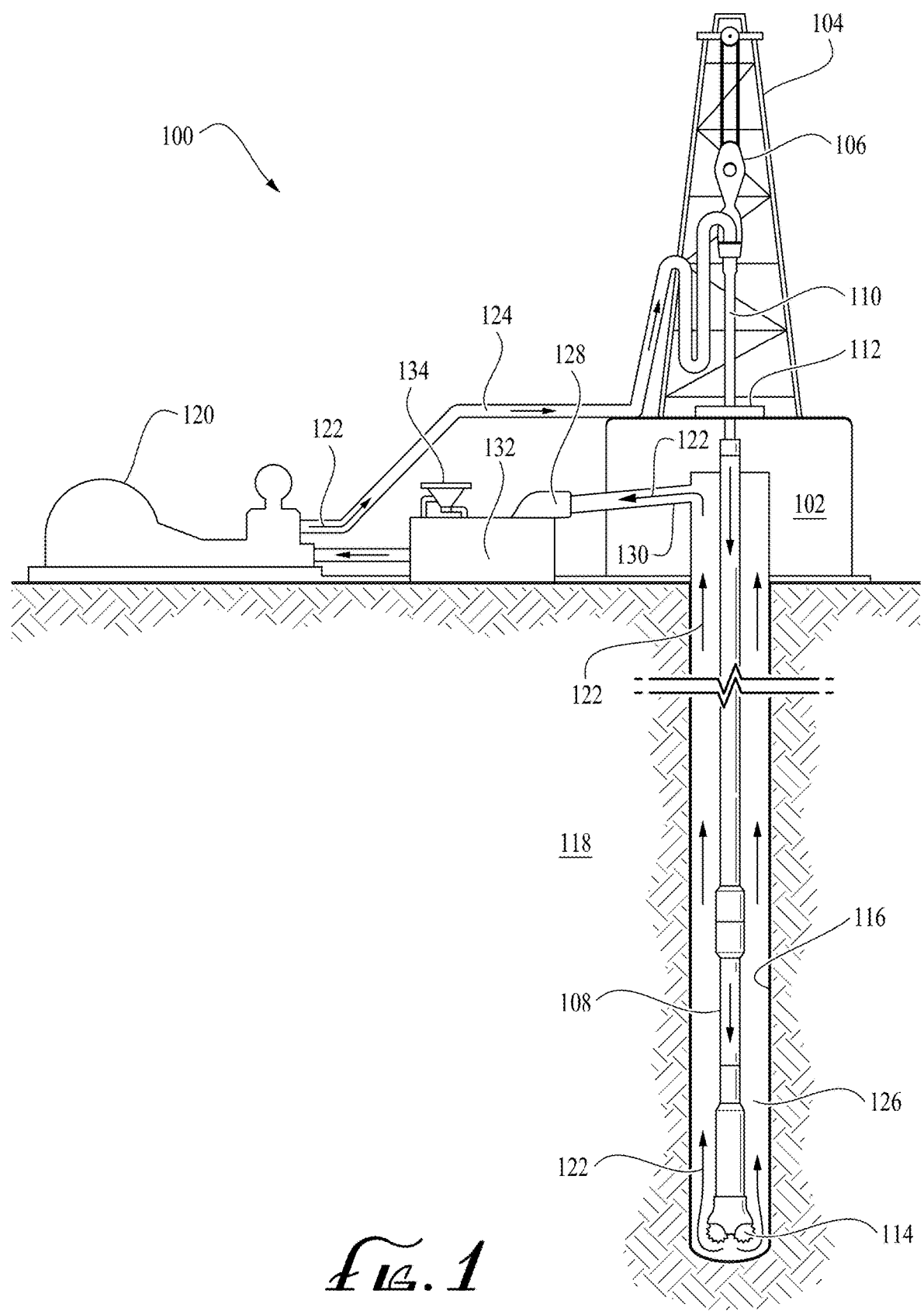
FIG. 1 depicts a wellbore servicing environment and a system configured for delivering the lubricant composition described herein to a downhole location according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (e.g., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

A subterranean formation containing oil or gas hydrocarbons may be referred to as a reservoir, in which a reservoir may be located on-shore or off-shore. Reservoirs are typically located in the range of a few hundred feet (shallow reservoirs) to tens of thousands of feet (ultra-deep reservoirs). To produce oil, gas, or other fluids from the reservoir, a well is drilled into a reservoir or adjacent to a reservoir.

A well can include, without limitation, an oil, gas, or water production well, or an injection well. As used herein, a "well" includes at least one borehole having a borehole wall. A borehole can include vertical, inclined, and horizontal portions, and it can be straight, curved, or branched. As used herein, the term "borehole" includes any cased, and any uncased, open-hole portion of the borehole. Further, the term "uphole" refers a direction that is towards the surface of the well, while the term "downhole" refers a direction that is away from the surface of the well.

Percentages set forth in the specification are weight percentages except as otherwise indicated.

When drilling or completing wells in earth formations, various fluids are used in the well for a variety of reasons. Common uses for well fluids include: cooling and lubrication of cutting surfaces of drilling apparatus, transportation of pieces of formation or 'cuttings' dislodged by the cutting action of the teeth on a drill bit to the surface, controlling formation fluid pressure to prevent blowouts, suspending solids in a well, maintaining well stability, stabilizing and minimizing fluid loss into a formation through which a well is being drilled, fracturing the formation in the vicinity of a well, displacing a fluid within a well with another fluid, testing a well, cleaning a well, transmitting hydraulic horsepower to a drilling apparatus, emplacing a packer, abandoning a well or preparing a well for such abandonment, and otherwise treating a well or a formation.

In most rotary drilling procedures, the drilling fluid takes the form of a 'mud', e.g., a liquid having solids suspended therein. The solids function to impart desired rheological properties to the drilling fluid and also to increase the density thereof in order to provide a suitable hydrostatic pressure at the bottom of the well. An important function of the drilling fluid is to reduce the substantial torque on a rotating drill pipe caused by friction between the drill pipe and the wall of the well. If the lubricating properties of the drilling fluids are not sufficient and the drill pipe encounters excessive torque, drilling may be interrupted by costly delays.

After a well has been drilled, the drilling mud is generally replaced with a completion fluid, which is typically a solids-free or acid soluble, non-damaging formulation, selected to minimize reductions in permeability of the producing zone. The density of the completion fluid is generally chosen and controlled to ensure that the hydrostatic head or pressure of the fluid in the wellbore matches the hydrostatic pressure of the column of drilling fluid being displaced.

During the operation of deep wells, a wellbore treatment fluid must exhibit enhanced lubricity. Increased lubricity is often required during wellbore cleanup, coil tubing operations, wireline operations, and the running of production tubulars. For several decades, brines have been utilized for well drilling and completions. High density brines have been found to have particular applicability for use in deep wells. Exemplary high density brines include, without limitation, sodium chloride, potassium chloride, calcium chloride, sodium bromide, calcium bromide, zinc bromide, sodium formate, potassium formate, and cesium formate brines. While high density brines have been found sufficient in providing the lubricity and viscosity of a wellbore treatment fluid under extreme shear, pressure and temperature variances, such brines may prove ineffective if unable to exhibit the constant lubricity required during high shear conditions.

Various components or additives for use as lubricants in water-based drilling fluids as well as completion fluids are known. However, many of the known additives are not compatible with brines, or with drilling fluids or completion fluids containing brine as a major component. For example, ester cleavage of carboxylic acid ester additives often results in the creation of components with a substantial tendency to foam, which introduces undesirable side effects into the fluid systems. Similarly, sulfonates of vegetable oils, which have also been used as lubricants in water-based systems, also generally show undesirably substantial foaming. Furthermore, conventional additives used as lubricating agents in drilling fluids and/or completion fluids may present environmental concerns, and may not be economical in some applications. For example, stricter regulations with regard to biodegradability of wellbore (e.g., drilling) fluids and their constituents are reducing the use of otherwise suitable mineral oils.

Accordingly, an ongoing need exists for lubricants compatible with aqueous-based drilling fluids and/or completion fluids, such as those based on brines. When incorporated into wellbore or completion fluids, such lubricants should be effective at lowering torque and drag, and prevent sticking of downhole tubulars. In addition to enhancing lubricity, such lubricants should desirably be compatible with a variety of wellbore fluids, and be environmentally friendly.

Lubricants used for water-based fluids which consist of a vegetable oil as a source of lubricating aid generally encounter cheese or grease formation when used at high temperature and high salinity conditions. A cheese or grease forming situation can arise primarily due to the hydrolysis of vegetable oil, which then reacts with other additives in the fluid or the divalent ions and forms a greasy mass which separates out from the bulk medium of the fluid. This can negatively affect the fluid properties and/or lead to a problem as severe as formation damage. The current disclosure describes a lubricant composition which does not form a cheese or grease under high temperature conditions and in an extremely saline environment. Via this disclosure, a "high" saline environment comprises greater than or equal to about 10,000 ppm to 36,000 ppm of salt, for example, dissolved in 1 liter of water.

Accordingly, this disclosure provides a lubricant composition (also referred to herein simply as a "lubricant"), wellbore servicing fluids (also referred to herein simply as "wellbore fluids") comprising the lubricant composition, and to methods of making and using the lubricant composition which may be included in a wellbore servicing fluid. The wellbore servicing fluid including the lubricant composition can be introduced to a wellbore penetrating a subterranean formation. The methods disclosed herein involve making and using this lubricant composition for servicing a wellbore penetrating a subterranean formation, more specifically, for using this lubricant composition, optionally in a wellbore servicing fluid (WSF), to provide (e.g., consistent) lubricity during an operation (e.g., a drilling, completions, or coiled tubing operation).

The lubricant composition of this disclosure can function as an additive for lowering torque (rotary friction) and drag (axial friction) in a wellbore and to lubricate bit bearings, if not sealed. In one or more specific embodiments, the lubricant composition includes a vegetable oil, a surfactant and a degreaser. Lubricant compositions of this disclosure may be characterized by the maintenance of lubricity in the presence of high salt (e.g., in the presence of formation fluids and/or as a component of monovalent or divalent brines) and/or high temperatures, such as those encountered downhole. For example, the lubricant composition can provide for maintaining lubricity up to at least 300° F. (148.9° C.), 325° F. (162.8° C.), 350° F. (176.7° C.), or 360° F. (182.2° C.), in embodiments. In particular, lubricant compositions of this disclosure, when contacted with monovalent or multivalent salts, can remain stable. In embodiments, the lubricant composition can provide for maintaining lubricity at salinities in brines. As utilized herein, stability can refer to minimal or substantially no detectable phase separation and/or formation of insoluble particles or coagulation.

The lubricant composition can be designed to reduce the coefficient of friction due, for example, to the presence of fine solids and salts in wellbore fluids, particularly in water-based drilling and/or completions fluids, such as those containing brine. Although traditional lubricants can be sufficient in certain applications, such traditional lubricants may be uneconomical and/or unsuitable in other applications, for example being unstable in high temperature applications, being incompatible with certain components of wellbore (e.g., drilling or completions) fluids, producing undesirable foaming and/or agglomeration (sometimes referred to as "cheese and grease"), and/or leading to challenging and costly environmental issues.

Although in the following, emphasis may be placed on drilling, drilling fluids, and drilling muds based on such drilling fluids, it should be understood that modification according to this disclosure of other wellbore fluids, such as used for drill-in, completions, workover, and stimulation, and coiled tubing operations (placement and use of coiled tubing) with a lubricant of this disclosure is intended to be within the scope of this disclosure. For example, exemplary coiled tubing applications is described hereinbelow. Similarly, although the following disclosure may emphasize water-based wellbore servicing fluids (e.g., water-based drilling fluids and drilling muds based thereon), it should be understood that modification according to this disclosure of other wellbore fluids, such as, for example, invert emulsions, is intended to be within the scope of this disclosure.

Disclosed herein is a lubricant composition comprising a vegetable oil, a degreasing agent, and a (e.g., at least one) non-ionic surfactant. In embodiments, the lubricant composition comprises from about 50 to about 90, from about 75 to about 95, from about 75 to about 90, from about 80 to about 90, or from about 80 to about 95 weight percent (wt %) of the vegetable oil based on a total weight of the lubricant composition, from about 0.1 to about 25, from about 5 to about 25, from about 10 to about 20, or from about 10 to about 15 wt % of the degreasing agent based on the total weight of the lubricant composition, and from about 0.01 to 5, from about 0.01 to about 0.5, from about 0.1 to 15, or from about 0.1 to about 0.2 wt % of the non-ionic surfactant based on the total weight of the lubricant composition. In embodiments, the lubricant composition further comprises a pour point depressant. Each of these components will be described in more detail hereinbelow.

A lubricant composition of this disclosure comprises a vegetable oil (also referred to herein as a "fatty acid component") comprising at least one fatty acid. In embodiments, the fatty acid component is provided by one or more vegetable oil. The one or more vegetable oil may be a naturally occurring vegetable oil, a genetically modified vegetable oil, or a combination thereof. Any vegetable oil compatible with the other components of the lubricant composition may be included in the composition. In embodiments, a lubricant composition according to this disclosure comprises, without limitation, one or more vegetable oils selected from custard seed oil, almond oil, babassu oil, castor oil, clark A oil, avocado oil, apricot oil, coffee bean oil, coconut oil, corn oil, cotton seed oil, jojoba oil, mustard seed oil, olive oil, palm oil, peanut oil, safflower oil, sesame oil, soybean oil, sunflower seed oil, wheat germ oil rapeseed oil, meadowfoam oil, *lesquerella* oil, borage oil, evening primrose oil, palm kernel oil, canola oil, linseed oil, rice oil, or a combination thereof. In embodiments, the vegetable oil comprises sunflower oil, safflower oil, corn oil, soybean oil, rapeseed oil, meadowfoam oil, *lesquerella* oil, castor oil, borage oil, evening primrose oil, coconut oil, palm oil, palm kernel oil, canola oil, linseed oil, rice oil, peanut oil, cottonseed oil, olive oil, or a combination thereof. In embodiments, the fatty acid component and/or the one or more vegetable oil comprises one or more fatty acid selected from fatty acids containing from about 6 to about 22 carbon atoms. In embodiments, the fatty acid component/vegetable oil comprises primarily a fatty acid selected from fatty acids containing from about 6 to about 22 carbon atoms. In embodiments, the fatty acid component/vegetable oil comprises primarily one or more fatty acid selected from ricinoleic acid, oleic acid, linoleic acid, linolenic acid, stearic acid, palmitic acid, dihydroxystearic acid, octanoic acid, nonaoic acid, decanoic acid, lauric acid, myristic acid, and tricanoic acid. Various other fatty acids and/or impurities may be present in the fatty acid component/vegetable oil, in embodiments, as long as they do not unacceptably affect the lubricating effectiveness of the lubricant composition. Fatty acids of the type disclosed herein may be present in the vegetable oil in an amount of from about 0.1 wt % to about 95 wt %, alternatively from about 0.1 wt % to about 80 wt %, alternatively from about 10 wt % to about 60 wt % or alternatively from about 80 wt % to about 95 wt % based on the total weight of the vegetable oil.

In embodiments, the lubricant composition can include vegetable oil in an amount of from about 50 weight percent (wt %) to about 90 wt %, from about 75 wt % to about 95 wt %, from about 75 wt % to about 90 wt %, or from about 80 wt % to about 90 wt % based on the total weight of the lubricant composition. In embodiments, the lubricant composition may include greater than or equal to about 50, 60, 70, 75, 80, 85, 90, or 95 wt % of the vegetable oil. In embodiments, the lubricant composition can include about 50, 60, 70, 75, 80, 85, 90, or 95 wt % of the vegetable oil. That is, in embodiments, the vegetable oil can make up a majority of the lubricant composition (e.g., greater than or equal to about 50 wt % thereof).

In embodiments, the fatty acid component/vegetable oil will generate a stable emulsion of oil in water when combined with surfactant(s). As utilized herein, a "stable" emulsion is one which shows minimal or no phase separation and/or coagulation, within the limits of the application. In embodiments, such a stable oil in water emulsion is formed when the one or more surfactants (detailed further hereinbelow) provide a hydrophilic-lipophilic balance (HLB) value in the range of from about 10 to about 18, from about 12 to about 18, from about 13 to about 17, from about 12 to about 17, from about 12 to about 16, from about 13 to about 16, from about 12 to about 15, from about 13 to about 15, or from about 14 to about 15. In embodiments, the fatty acid component/vegetable oil will generate a stable emulsion of oil in water when the surfactant(s) provide an HLB of equal to or about 10, 10.5, 11, 11.5, 12, 12.5, 13, 13.5, 14, 14.5, 15, 15.5, 16, 16.5, 17, 17.5, or 18, or any value thereamong. In embodiments, the fatty acid component/vegetable oil will generate a stable emulsion of oil in water when the surfactant(s) provide an HLB of equal to or about 10, 10.5, 11, 11.5, 12, 12.5, 13, 13.5, 14, 14.5, 15, 15.5, 16, 16.5, 17, 17.5, or 18, or any value thereamong.

In embodiments, a lubricant of this disclosure comprises soybean oil. Soybean is a vegetable oil that can be obtained by pressing soybeans. Soybean oil typically comprises a variety of fatty acids in varying amounts depending on the soybean composition from which it is obtained and the method of obtaining the soybean oil. Such fatty acids naturally occurring in soybean oil may include one or more of oleic acid, stearic acid, palmitic acid, linoleic acid, linolenic acid, and arachidic acid. A suitable soybean oil may comprise solely one, or any combination of two or more of the aforementioned fatty acids. Various other fatty acids and/or impurities may be present in the soybean oil, in embodiments, as long as they do not unacceptably affect the lubricating effectiveness of the lubricant composition. In embodiments, the disclosed lubricant composition is not limited to a specific fatty acid composition of soybean oil.

In embodiments, a lubricant composition of this disclosure comprises from about 50 wt % to about 90 wt %, from about 75 wt % to about 95 wt %, from about 75 wt % to about 90 wt %, from about 80 wt % to about 90 wt %, or from about 80 wt % to about 95 wt % soybean oil. In embodiments, a lubricant composition of this disclosure comprises greater than or equal to about 50, 60, 70, 75, 80, 90, or 95 weight percent soybean oil. In embodiments, a lubricant composition of this disclosure comprises from about 50 wt % to about 90 wt %, from about 75 wt % to about 95 wt %, from about 75 wt % to about 95 wt %, from about 80 wt % to about 90 wt %, or from about 80 wt % to about 95 wt % degummed soybean oil. In embodiments, a lubricant composition of this disclosure comprises greater than or equal to about 50, 60, 70, 75, 80, 90, or 95 weight percent degummed soybean oil.

In embodiments, the soybean oil comprises degummed soybean oil. Degummed soybean oil is soybean oil from which natural gums (phospholipids) have been removed, for example by hydration and separation (e.g., mechanical separation). In embodiments, the degummed soybean oil comprises less than about 5, 4, 3, 2, or 1% moisture and, less than or equal to about 5, 4, 3, 2, or 1% of phospholipids.

A lubricant composition according to this disclosure comprises a degreasing agent. In one or more embodiments, the degreasing agent comprises a reactive ester. A reactive ester may be converted to an acidic species by hydrolysis of the ester linkage, for example by contact with water present in the aqueous fluid of a wellbore fluid and/or present in situ in the wellbore. The rate of hydrolysis of a reactive ester can depend on a variety of factors including the temperature, specific ester and the pH of the solution. In embodiments, the reactive esters can be denoted generically as RCOOR' where R is the acidic moiety and R' is an organyl group. In the RCOOR' reactive ester, RCO can be derived from acid where the OH (hydroxyl group) is replaced by alkoxy/organyl group OR'. In some aspects, R can be characterized by a low steric hinderance. Herein steric hinderance refers to the slowing of chemical reactions due to large groups on a molecule hindering the approach of a reactant.

Suitable reactive esters include, without limitation, lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly(ε-caprolactones); poly(hydroxybutyrates); poly(anhydrides); aliphatic polycarbonates; poly(amino acids); and polyphosphazenes; or copolymers thereof: poly (ortho esters); orthoesters (which may also be known as "poly ortho ethers" or "ortho ethers"); esters of oxalic acid; aliphatic polyesters; poly(lactides); poly(glycolides); poly (ε-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof, or a combination thereof. Other suitable reactive esters include, without limitation, halide esters and esters of acids such as esters of nitric acid, sulphuric acid, sulphonic acid, sulphinic acid, phosphoric acid, phosphorous acid, phosphonic acid, phosphinic acid, sulphamic acid and the like.

In embodiments, the reactive ester comprises diethylene glycol diformate, diethylene glycol monoformate, monoethylene monoformate, monoethylene diformate, ethyl lactate, methyl lactate, tri-n-propyl orthoformate, tri-n-butyl orthoformate, or a combination thereof.

In embodiments, the degreasing agent comprises a lactic acid ester. In embodiments, the lactic acid ester is a $C_1$-$C_4$ ester of lactic acid. Exemplary $C_1$-$C_4$ alcohols for producing the lactic acid ester include methanol, ethanol, propanol, isopropanol, allyl alcohol, butanol, 3-buten-1-ol, t-butanol and sec-butanol. In embodiments, the lactic acid ester comprises ethyl lactate. Ethyl lactate is the ester of natural lactic acid that can be produced by fermentation of corn-derived feedstock. Lactic acid esters may be particularly desirable because they are 100% biodegradable, breaking down into carbon dioxide and water, and are also non-toxic, and renewable. In embodiments, the degreasing agent comprises ethyl lactate.

In embodiments, the degreasing agent comprises a short chain ester. In embodiments, the degreasing agent comprises a short chain fatty acid ester. Short-chain fatty acid esters are a group of low-molecular-weight chemicals that are mainly made by esterification of alcohols and short chain fatty acids. For example, as utilized herein, a short chain (e.g., fatty acid) ester can have a molecular weight of less than or equal to about 100, 200, 300, 400, or 500 g/mol. In embodiments, the short chain fatty acid ester is formed from fatty acids having from about 5 to about 10, from about 5 to about 8, or from about 5 to about 6 carbons, or having 5, 6, 7, 8, 9, 10, or more carbons atoms. In embodiments, the degreasing agent comprises a short chain aliphatic ester. In embodiments, the degreasing agent comprises an aliphatic short chain fatty acid ester Such short chain esters can include esters having a hydroxy moiety, which further comprise at least five carbon atoms, either aliphatic or aromatic, such as ethyl lactate.

As noted hereinabove, in embodiments the lubricant composition comprises from about 5 to about 25, from about 0.1 to about 25, from about 0.1 to about 30, from about 10 to about 20 percent, or from about 10 to about 15 percent of the degreasing agent. For example, in embodiments, the lubricant composition comprises from about 5 to about 25, from about 10 to about 20 percent, or from about 10 to about 15 percent ethyl lactate.

A lubricant composition according to this disclosure comprises at least one surfactant. In embodiments, a lubricant composition of this disclosure comprises at least one non-ionic surfactant. In embodiments, a lubricant composition of this disclosure comprises a blend of at least two surfactants. In embodiments, a lubricant composition of this disclosure comprises a blend of at least two non-ionic surfactants. In embodiments, a lubricant composition of this disclosure comprises a blend of two surfactants. In embodiments, a lubricant composition of this disclosure comprises a blend of two non-ionic surfactants. In embodiments, a lubricant composition of this disclosure comprises a blend of at least three surfactants. In embodiments, a lubricant composition of this disclosure comprises a blend of at least three non-ionic surfactants. In embodiments, a lubricant composition of this disclosure comprises a blend of three surfactants. In embodiments, a lubricant composition of this disclosure comprises a blend of three non-ionic surfactants.

As noted hereinabove, desirably, the HLB of the surfactant(s) or of a blend of surfactants in a lubricant composition of this disclosure is suitable to form a stable emulsion when combined with the vegetable oil component. Without being limited by theory, such selection of the surfactant component for the desired fatty acid/vegetable oil component may yield optimum surface activity to create a stable and homogeneous emulsion. The HLB value of the individual surfactant(s) of a blend of surfactants is not particularly limited, so long as the HLB value of the lubricant component is compatible with the HLB value suitable to form a stable emulsion of the fatty acid/vegetable oil component of the lubricant composition.

In embodiments, the stable phase is formed when the surfactant (e.g., a non-ionic surfactant) provides an HLB value in the range of from about 1 to about 20, alternatively from about 2 to about 20, alternatively from about 4 to about 18, alternatively from about 4 to about 17, alternatively from about 4 to about 12, alternatively from about 4 to about 8, alternatively from about 10 to about 18, alternatively from about 12 to about 18, alternatively from about 13 to about 17, alternatively from about 12 to about 17, alternatively from about 12 to about 16, alternatively from about 13 to about 16, alternatively from about 12 to about 15, alternatively from about 13 to about 15, or alternatively from about 14 to about 15. In embodiments, the vegetable oil may form a stable phase when the (e.g., at least one) surfactant provides an HLB of equal to or about 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, or 18. The at least one surfactant may be selected for an optimum surface activity to create a stable phase with the vegetable oil (e.g., soybean oil). In embodiments, the at least one surfactant may provide an HLB that is within 1, 2, 3, 4, or 5 of the HLB value suitable to form a stable phase with the vegetable oil.

The lubricant composition of the present disclosure includes a (e.g., at least one) non-ionic surfactant. Suitable non-ionic surfactants may include, but are not limited to, linear alcohol polyethylene oxide ethers, polyethylene glycol (PEG) esters of fatty acids, sorbitan esters, and/or polyethoxylated sorbitan esters, and the like, or combinations thereof. In embodiments, a lubricant composition of this disclosure comprises from about 0.01 to 5, from about 0.1 to 25, from about 0.1 to 15, from about 0.01 to about 0.5, or from about 0.1 to about 0.2 percent of the non-ionic surfactant based on the total weight of the lubricant composition. In embodiments, a lubricant composition of this disclosure comprises less than or equal to about 15, 10, 9, 8, 7, 6, 5, 4, 3, 2, 1, 0.9, 0.8, 0.7, 0.6, 0.5, 0.4, 0.3, or 0.2 weight percent of the at least one non-ionic surfactant.

In embodiments, the at least one non-ionic surfactant includes sorbitan esters, and/or derivatives thereof, including, but not limited to, sorbitan monolaurate, sorbitan monopalmitate, sorbitan monostearate, sorbitan monooleate, sorbitan sesquioleate, sorbitan trioleate, sorbitan isostearate, polyethoxylated sorbitan esters, and any combination thereof. In embodiments, a lubricant composition of this disclosure comprises from about 0.01 to 5, from about 0.1 to about 15, from about 0.01 to about 0.5, or from about 0.1 to about 0.2 percent of the at least one sorbitan ester and/or derivatives thereof. In embodiments, a lubricant composition of this disclosure comprises less than or equal to about 5, 4, 3, 2, 1, 0.9, 0.8, 0.7, 0.6, 0.5, 0.4, 0.3, or 0.2 weight percent of at least one sorbitan ester and/or derivatives thereof, or a percentage thereamong.

In embodiments, the lubricant composition may include a single sorbitan ester. In embodiments, the lubricant composition can include sorbitan monooleate, [(2R)-2-[(2R,3R,4S)-3,4-dihydroxyoxolan-2-yl]-2-hydroxyethyl] (Z)-octadec-9-enoate, otherwise known as SPAN™ 80 (available from Croda Inc., Plainsboro, NJ). In embodiments, the lubricant composition may include at least one sorbitan ester having a molecular weight of less than about 1500, about 1250, about 1000, about 950, about 750, or about 500 Daltons (Da).

In embodiments, a lubricant composition of this disclosure comprises one or more non-ionic surfactant selected from sorbitan polyoxyethylene fatty acid esters, including but not limited to: polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, or a combination thereof. In embodiments, the non-ionic surfactant can include a sorbitan ester that is polyethoxylated sorbitan monolaurate, polyethoxylated sorbitan monooleate, or a combination thereof. In embodiments, a lubricant composition according to this disclosure comprises one or more polyethoxylated sorbitan ester comprising from about 4 to about 20 moles of ethylene oxide, from about 10 to about 20 moles of ethylene oxide, or from about 10 to about 15 moles of ethylene oxide. In embodiments, a lubricant composition according to this disclosure comprises one or more polyethoxylated sorbitan ester comprising equal to or about 20 moles of ethylene oxide. For example, suitable non-ionic surfactants include PEG-20 sorbitan monolaurate, PEG-20 sorbitan monopalmitate, PEG-20 sorbitan monostearate, PEG-20 sorbitan tristearate, PEG-20 sorbitan monooleate, and the like.

In embodiments, a lubricant composition according to this disclosure comprises a total weight percentage of one or more polyethoxylated sorbitan esters in the range of from about from about 0.1 to 15, from about 0.01 to 5, from about 0.01 to about 0.5, or from about 0.1 to about 0.2 percent polyethoxylated sorbitan ester(s). In embodiments, a lubricant composition according to this disclosure comprises a total weight percentage of one or more polyethoxylated sorbitan esters less than or equal to about 15, 10, 5, 4, 3, 2, 1, 0.9, 0.8, 0.7, 0.6, 0.5, 0.4, 0.3, or 0.2 weight percent, or a percentage thereamong. In embodiments, a lubricant composition according to this disclosure comprises one polyethoxylated sorbitan ester. In embodiments, a lubricant composition according to this disclosure comprises two polyethoxylated sorbitan esters. In embodiments, a lubricant composition according to this disclosure comprises at least two or exactly two polyethoxylated sorbitan esters. In embodiments, a lubricant composition according to this disclosure comprises polyethoxylated sorbitan monooleate, polyethoxylated sorbitan monolaurate, or both. In embodiments, a first polyethoxylated sorbitan ester comprises PEG-20 sorbitan monolaurate, and a second polyethoxylated sorbitan ester comprises PEG-20 sorbitan monooleate.

In embodiments, an HLB of the at least one surfactant may be suitable to form a stable phase when combined with the vegetable oil. As used herein, the term "stable phase" refers to a phase that shows minimal or no detectable phase separation and/or coagulation by visual inspection, within the limits of the application. The lubricant composition of the present disclosure may include an oil soluble surfactant with a low HLB (e.g., an HLB value in the range of from about 1 to about 10). In embodiments, the lubricant composition may include an oil insoluble surfactant with a higher HLB (e.g., an HLB value in the range of from about 10 to about 20). In embodiments, in absence of a surfactant with a low HLB (e.g., an HLB value in the range of from about 1 to about 10), the oil insoluble surfactant may phase out from a bulk or continuous oil phase including the vegetable oil. In embodiments, the oil soluble surfactant and the oil insoluble surfactant may together form a reverse micellar system and stabilize the bulk phase including the vegetable oil (e.g., soybean oil).

In embodiments, the at least one non-ionic surfactant includes sorbitan monooleate (e.g., SPAN™ 80 (Croda Inc., Plainsboro, NJ)), polyethoxylated sorbitan monooleate (e.g., TWEEN®-80 (Croda Americas L.L.C., Switzerland), polyethoxylated sorbitan monolaurate (e.g., TWEEN®-20 (Croda Americas L.L.C., Switzerland), or a combination thereof.

A lubricant composition of this disclosure may be provided as an additive for a wellbore servicing fluid (a "wellbore fluid"). The lubricant composition utilized as additive can, in embodiments, optionally include a diluent. Such a diluent may comprise, for example, an oleaginous fluid, an aqueous fluid, or a combination thereof.

As detailed further hereinbelow, a lubricant composition of this disclosure may be provided as a wellbore servicing fluid (a "wellbore fluid") containing a lubricant composition provided hereinabove and a base fluid. Such a base fluid may comprise, for example, an oleaginous fluid, an aqueous fluid (e.g., a brine), or a combination thereof.

A lubricant composition of this disclosure (and/or a wellbore fluid comprising same) may be stable at high temperatures, maintaining lubricity up to at least 300° F. (148.9° C.), 325° F. (162.8° C.), 350° F. (176.7° C.), 360° F. (182.2° C.), or more; and/or may exhibit stability at cold and surface temperatures, exhibiting no or reduced precipitation and/or color change, at least from temperatures of about 40° F. (4.4° C.) to about 120° F. (48.9° C.), from about 0° F. (−17.8° C.) to about 120° F. (48.9° C.), from about 0° F. (−17.8° C.) to about 140° F. (60.0° C.), or from about 0° F. (−17.8° C.) to about 160° F. (71.1° C.). In embodiments, the lubricant composition (and/or a wellbore fluid comprising same) is stable at downhole temperatures in a range of at least from about 150° F. (65.6° C.) to about 360° F. (182.2° C.), from about 160° F. (71.1° C.) to about 360° F. (182.2° C.), or from about 150° F. (65.6° C.) to about 350° F. (176.7° C.).

In embodiments, a lubricant composition of this disclosure further comprises one or more pour point depressant for cold temperature application. Such a pour point depressant may be incorporated to improve the flow of the lubricant at lower temperatures, e.g., for temperatures of less than about 40° F. (4.4° C.), 32° F. (0° C.), 30° F. (−1.1° C.), 20° F. (−6.7° C.), 10° F. (−12.2° C.), or 0° F. (−17.8° C.). In embodiments, a lubricant composition according to this disclosure comprises from about 0 wt % to about 10 wt %, from about 0.5 wt % to about 10 wt %, from about 1 wt % to about 10 wt %, from about 1 wt % to about 7 wt %, from about 1 wt % to about 6 wt %, from about 2 wt % to about 7 wt %, or from about 1 wt % to about 5 wt % of one or more pour point depressant. Suitable pour point depressants include, without limitation, glycerine, ethyl ether of ethylene glycol, propyl ether of ethylene glycol, butyl ether of ethylene glycol, diethylene glycol, propylene glycol, polymethacrylates, poly alpha olefins, ethylene glycol, and the like.

Also disclosed herein is a wellbore fluid containing a lubricant composition of this disclosure. Accordingly, the lubricant composition of this disclosure can, in embodiments, be provided in a wellbore fluid. Such a wellbore fluid contains a lubricant composition according to this disclosure in a fluid system containing a base fluid, which may comprise any suitable base fluid known in the art, including aqueous fluids, non-aqueous fluids, aqueous-miscible fluids, gases, or any combination thereof, provided the lubricant is compatible therewith. The wellbore fluid can thus comprise a base fluid and the lubricant composition described above and comprising vegetable oil, a degreasing agent, and a non-ionic surfactant. As used herein, the term "base fluid" refers to the major component of the fluid (as opposed to components dissolved and/or suspended therein), and does not indicate any particular condition or property of that fluid such as its mass, amount, pH, etc. Suitable base fluids into which the lubricant composition may be incorporated may include aqueous-based fluid systems, such as brines, water-based muds, and invert emulsion fluid systems, such as water-in-oil emulsions and oil-in-water emulsions.

As noted hereinabove, such wellbore fluids may, in embodiments, comprise, without limitation, a drilling fluid, a wellbore treatment fluid (e.g., a completions fluid, such as a brine), a coiled tubing fluid (e.g., introduced downhole via coiled tubing) and/or a coiled tubing lubricant (e.g., utilized to position coiled tubing downhole), as described further hereinbelow, or the like. The pH of the wellbore fluid may be highly alkaline, in embodiments greater than or equal to about 8, 8.5, 9, 9.5, 10, 10.5 or 11.

Suitable base fluids for use in conjunction with the disclosed lubricant composition may include, but not be limited to, aqueous-based fluids; aqueous-miscible fluids; water-in-oil emulsions; oil-in-water emulsions, and oil-based fluids. The base fluid of a wellbore fluid according to this disclosure can generally be from any source, provided that the fluids do not contain components that might adversely affect the stability and/or performance of the lubricant. Suitable fluid systems into which the disclosed lubricant may be incorporated thus include water-based fluid systems, such as brines; and invert emulsion fluid systems.

Examples 1-4 hereinbelow are directed to aqueous-based wellbore fluids containing a lubricant composition according to this disclosure incorporated into various brines or water-based mud. As a lubricant according to this disclosure is stable at elevated temperatures, in embodiments, a wellbore fluid of this disclosure comprises a high temperature wellbore (e.g., drilling) fluid system. In embodiments, a drilling fluid of this disclosure contains a high temperature water-based mud system. The Examples hereinbelow described incorporation of a lubricant of this disclosure into a water-based mud.

The disclosed lubricant composition may thus be used to reduce the coefficient of friction or to increase the lubricity of a wellbore fluid, such as a brine-based wellbore fluid. The amount of lubricant utilized is an amount operable to sufficiently reduce friction. The exact amount of the disclosed lubricant composition in the wellbore fluid may be determined by a trial and error method of testing the combination of drilling or completion fluid and lubricant to determine the reduction of friction achieved. In embodiments, the lubricant may be present in a wellbore fluid in a concentration of from about 0.01% to about 6%, from about 0.05% to about 5%, from about 0.5% to about 6%, from about 1% to about 6%, or from about 0.2% to about 4% by weight, or a range therebetween. In embodiments, the lubricant may be present in a wellbore fluid in a concentration of about 0.25%, 0.5%, 1%, 2%, 3%, 4%, 5%, or 6% by weight. In embodiments, the lubricant composition may be present in a wellbore fluid in a concentration of at most 10%, 6%, 5%, 4% or 3% by weight.

As noted hereinabove, in embodiments, a wellbore fluid according to this disclosure comprises a water-based wellbore fluid system (e.g., a water-based drilling fluid system), containing an aqueous base fluid. Aqueous base fluids that may be suitable for use in the methods and compositions of the present disclosure may comprise water from any source, provided that it does not contain compounds that adversely affect other components of the fluid. In various embodiments, the aqueous base fluid may include fresh water, salt water (e.g., water containing one or more salts dissolved therein), seawater, brine (e.g., saturated salt water), or a combination thereof.

The aqueous base fluids may be from a source that does not contain compounds that adversely affect other components of a fluid. In embodiments of the present disclosure, the aqueous base fluids may include one or more ionic species, such as those formed by salts dissolved in water. For example, seawater and/or produced water may include a variety of divalent cationic species dissolved therein. In embodiments, an aqueous base fluid according to the present disclosure may comprise water with one or more water-soluble salts dissolved therein. In embodiments of the present disclosure, the one or more salts can include inorganic salts, formate salts, or any combination thereof. Inorganic salts can include monovalent salts, which can be further selected from: alkali metal halides (e.g., sodium chloride), ammonium halides, and any combination thereof. Brines including such monovalent salts may be referred to as "monovalent brines." Inorganic salts can also be selected from the group of divalent salts, such as alkaline earth metal halides (e.g., $CaCl_2$), $CaBr_2$, etc.) and zinc halides. Brines comprising such divalent salts may be referred to as "divalent brines." In general, monovalent salts can be used to form drilling or wellbore fluids, and may having an aqueous phase having a density up to about 12.5 lb/gal (1498 kg/m$^3$). Brines comprising halide-based salts may be referred to as "halide-based brines." In general, divalent salts and formate salts can be used to form wellbore fluids having an aqueous phase having a density up to about 19.2 lb/gal (2300 kg/m$^3$). In various embodiments, the one or more inorganic salts are in a sufficient concentration such that the density of the aqueous phase is in the range of about 9 lb/gal (1078 kg/m$^3$) to about 19.2 lb/gal (2300 kg/m$^3$). In embodiments according to the present disclosure, the one or more inorganic salts are selected and in a sufficient concentration such that the density of the aqueous phase is greater than about 9.5 lb/gal (1138 kg/m$^3$). In embodiments according to the present disclosure, the one or more inorganic salts are selected and in a sufficient concentration such that the density of the aqueous phase is greater than about 13 lb/gal (1558 kg/m$^3$).

In embodiments, the aqueous base fluid can comprise a monovalent brine, a divalent brine, or a combination thereof. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

Monovalent salts may be used to prepare wellbore servicing fluids, and may have an aqueous phase having a density up to about 12.5 lb/gal (1498 kg/m$^3$). Divalent salts and formate salts may be used to form drilling or wellbore fluids having an aqueous phase having a density up to about 19.2 lb/gal (2300 kg/m$^3$). In embodiments, the one or more inorganic salts may be in a sufficient concentration such that the density of the aqueous phase is in the range of about 9 lb/gal (1078 kg/m$^3$) to about 19.2 lb/gal (2300 kg/m$^3$). In embodiments according to the present disclosure, the one or more inorganic salts may be selected and in a sufficient concentration such that the density of the aqueous phase is greater than about 9.5 lb/gal (1138 kg/m$^3$). In embodiments according to the present disclosure, the one or more inorganic salts are selected and in a sufficient concentration such that the density of the aqueous phase is greater than about 13 lb/gal (1558 kg/m$^3$).

In embodiments, a wellbore servicing fluid of the present disclosure may include a brine having a density in the range of from about 9 to about 12.5 lbs/gal (pounds per gallon or "ppg") (from about 1078 to about 1498 kg/m$^3$), from about 9.5 to about 12.5 ppg (from about 1138 to about 1498 kg/m$^3$), or from about 9 to about 12 ppg (from about 1078 to about 1438 kg/m$^3$). In embodiments, a wellbore servicing fluid of this disclosure may include a brine having a density of greater than or equal to about 9, 9.5, 10, 10.5, 11, or 11.5 ppg (greater than or equal to about 1078, 1138, 1198, 1258, 1318, or 1378 kg/m$^3$).

In embodiments, a composition of the present disclosure includes the lubricant composition described herein and a brine, for example, in weight percent of about 0.5% lubricant composition and about 99.5% brine, alternatively about 1% lubricant composition and about 99% brine, alternatively about 5% lubricant composition and about 95% brine, or alternatively about 10% lubricant composition and 90% brine.

In embodiments, a mixture of the herein disclosed lubricant compositions and a brine can form less than about 1 wt % insoluble particles, alternatively less than about 0.5 wt % insoluble particles or alternatively less than about 0.1 wt % insoluble particles based on the total weight of the mixture. Hereinafter, the weight percent refers to the weight percent on the basis of the total weight of the composition being described. In embodiments, a mixture of a lubricant composition of the type disclosed herein and a brine results in substantially no separation of the oil present in the mixture from the aqueous portion of the mixture. Alternatively, the volume ratio of the oil phase to aqueous phase is less than or equal to about 5:95, alternatively less than or equal to about 2:98 or alternatively less than or equal to about 1:99.

Examples of a non-aqueous base fluid that may be suitable for use as a carrier fluid include, but are not limited to an oil or oleaginous fluid, a hydrocarbon, an organic liquid, a mineral oil, a synthetic oil, an ester, or any combination thereof. Examples of non-aqueous base fluids suitable for certain embodiments of the present disclosure include, but are not limited to, natural oil based muds (OBM), synthetic based muds (SBM), natural base oils, synthetic base oils and invert emulsions. In embodiments, the non-aqueous base fluid may include safra oil. In embodiments, the non-aqueous base fluid may include any petroleum oil, natural oil, synthetically derived oil, or combinations thereof. In embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the wellbore servicing fluid itself or from the wellbore, or it may be intentionally added to affect the properties of the wellbore servicing fluid. Any known non-aqueous fluid may be used to form the external oil phase of the invert emulsion fluid. In embodiments, the non-aqueous base fluid does not include a significant amount of water.

Suitable water-in-oil emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or including an aqueous-miscible fluid. In embodiments, when a lubricant composition of the present disclosure is added to an aqueous base fluid, the vegetable oil may form an oil-in-water emulsion as a result of a surfactant with a higher HLB (e.g., an HLB value in the range of from about 10 to about 20) present in the lubricant composition.

Suitable aqueous-miscible base fluids may include, but are not limited to, alcohols (e.g., methanol, ethanol, n-propanol, isopropanol, n-butanol, sec-butanol, isobutanol, and t-butanol; glycerins); glycols (e.g., polyglycols, propylene glycol, and ethylene glycol); polyglycol amines; polyols; any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

Suitable oil-based fluids according to embodiments of this disclosure may include alkanes; olefins; aromatic organic compounds; cyclic alkanes; paraffins; diesel fluids; mineral oils; desulfurized hydrogenated kerosenes; and any combination thereof.

In embodiments, the density of the base (e.g., aqueous base) fluid can be adjusted, among other purposes, to provide additional particulate transport and suspension in the compositions of the present disclosure. In embodiments, the pH of the base fluid may be adjusted (e.g., by a buffer or other pH adjusting agent) to a specific level, which may depend on, among other factors, the types of lubricant, gelling agents, acids, and/or other additives included in the fluid.

In embodiments, wellbore fluids according to this disclosure may comprise a mixture of one or more fluids and/or gases, including but not limited to emulsions, foams, and the like. The base fluids for use in the present wellbore fluids may additionally be gelled or foamed by any means known in the art.

The lubricant composition used in accordance with the methods and compositions of the present disclosure may be present in the wellbore fluid in an amount sufficient to provide a desired lubricity. In embodiments, the lubricant composition may be present in the wellbore fluid in an amount from about 0.1 wt % to about 20 wt %, from about 1 wt % to about 10 wt %, or from about 1 wt % to about 20 wt %. In embodiments, the lubricant composition may be present in the wellbore fluid in an amount from about 0.1 wt % to about 10 wt % by total weight of the wellbore fluid. In embodiments, the lubricant composition may be present in the wellbore fluid in an amount from about 0.5 wt % to about 5 wt % by total weight of wellbore fluid. In embodiments, the lubricant composition may be present in the wellbore fluid in an amount of about 2 wt % by total weight of the wellbore fluid. In embodiments, the lubricant composition may be present in the wellbore fluid in an amount from about 0.5 wt % to about 1.5 wt %, from about 1.5 wt % to about 2.5 wt %, from about 2.5 wt % to about 3.5 wt %, from about 3.5 wt % to about 4.5 wt %, or from about 4.5 wt % to about 5.5 wt % based on the total weight of the wellbore fluid.

A lubricant composition according to this disclosure may be especially effective in drilling and drill-IN or completions fluids containing brine. As illustrated in the Examples hereinbelow, a lubricant of this disclosure is generally stable to high temperatures, maintaining lubricity up to at least 300° F. (148.9° C.), 325° F. (162.8° C.), 350° F. (176.7° C.), or 360° F. (182.2° C.); and/or may provide a reduction in the coefficient of friction of up to at least 25%, 30%, 35%, 40%, 45%, 50%, 60%, or 70% relative to untreated wellbore fluids (see Examples hereinbelow). The lubricant of this disclosure may provide a foam-suppressing effect, exhibiting a minimal amount or tendency to foam when added to a wellbore fluid, e.g., a divalent brine. In embodiments, foaming is reduced by at least 20%, 30%, 40%, or 50% relative to conventional lubricants. Wellbore fluids of this disclosure may exhibit compatibility with high volume percentages of oil contamination. In embodiments, a wellbore fluid of this disclosure is compatible with at least up to 10, 15, 20, or 25 volume percent oil contamination. In embodiments, a wellbore fluid of this disclosure is compatible with at least up to 50, 75, or 100 pounds per barrel (ppb) (e.g., at least up to 142.5, 213.8, or 285 kg/m$^3$) cuttings contamination.

A wellbore fluid of this disclosure may optionally comprise any number of additional additives in combination with the lubricant composition. Examples of such additional additives include, without limitation, additional surfactants, salts, diverting agents, weighting agents, surfactants, emulsifiers, acids, alkalinity agents, pH buffers, fluorides, fluid loss control additives, fluid loss control additives, gases, nitrogen, carbon dioxide, surface modifying agents, tackifying agents, foamers, corrosion inhibitors, scale inhibitors, catalysts, clay control agents, biocides, bactericides, additional friction reducers, antifoam agents, bridging agents, dispersants, flocculants, $H_2S$ scavengers, $CO_2$ scavengers, oxygen scavengers, additional viscosifiers, breakers, relative permeability modifiers, resins, particulate materials (e.g., proppant particulates), wetting agents, coating enhancement agents, filter cake removal agents, surfactants, rheology modifiers, filtration control agents, defoamers, shale stabilizers, oils, lost circulation materials, additional lubricants, antifreeze agents (e.g., ethylene glycol or polyethylene glycol), and the like. One or more of these additives (e.g., bridging agents) may comprise degradable materials that are capable of undergoing irreversible degradation downhole. A person skilled in the art, with the benefit of this disclosure, will recognize the types of additives that may be included in the wellbore fluids of the present disclosure for a particular application. Such additives may be included in the wellbore singularly or in combination. In embodiments, the one or more additives are present in the wellbore fluid in an amount of from about 0.001 wt % to about 50 wt %, based on the total weight of the wellbore fluid, alternatively from about 0.1 wt % to about 50 wt %, or alternatively from about 1 wt % to about 40 Wt %.

For example, in embodiments, the wellbore fluids used in accordance with the methods of the present disclosure optionally may include a weighting agent. In embodiments, the weighting agent may be added to produce a desired density in the wellbore fluid. In embodiments, the weighting agent may include barite. Examples of other weighting agents include, but are not limited to, hematite, magnetite, iron oxides, illmenite, siderite, celestite, dolomite, olivine, calcite, magnesium oxides, halites, calcium carbonate, strontium sulfate, and manganese tetraoxide.

A wellbore fluid of this disclosure may, in embodiments, further comprise at least one additional lubricant, and contain a total weight percent of lubricant equal to the sum of the weight percent of the herein disclosed lubricant and the weight percent of the at least one additional lubricant. Such a wellbore fluid may exhibit a lower coefficient of friction than a wellbore fluid absent the additional lubricant.

In embodiments, the wellbore fluids including a lubricant composition as described herein optionally may include one or more additional surfactants. The additional surfactant may, among other purposes, help disperse the lubricant composition and/or other additives in a wellbore fluid. Examples of additional surfactants that may be suitable for use may include, but are not limited to, an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

Wellbore fluids according to this disclosure may be prepared by any method suitable for a given application. For example, certain components of a wellbore fluid of embodiments of the present disclosure may be provided in a pre-blended liquid or powder or a dispersion of powder in an aqueous or non-aqueous liquid, which may be combined with a carrier or base fluid at a subsequent time. After the preblended liquids and the carrier fluid have been combined, other suitable additives may be added prior to introduction into the wellbore. For example, a lubricant composition according to this disclosure can be added directly to a drilling or completion fluid (e.g., a coiled tubing fluid), or may be formulated in a carrier fluid (e.g., an aqueous carrier) fluid which is then added to the drilling or completion fluid (e.g., a brine for the drilling or completion fluid). Other suitable methods for the preparation of the wellbore fluids of the present disclosure are within the scope of this disclosure.

Also disclosed herein are methods of introducing a lubricant and/or wellbore fluids comprising the lubricant of this disclosure according to this disclosure into a wellbore. In embodiments, a method of this disclosure comprises introducing the lubricant composition into a subterranean (e.g., formation) zone. In embodiments, the lubricant is introduced into the subterranean zone as a component of a wellbore fluid comprising the lubricant composition and a base fluid as described hereinabove.

The methods of the present disclosure may be employed in any subterranean application where a lubricant or wellbore fluid of this disclosure may be suitable. In embodiments, a method of treating a wellbore comprises mixing a base fluid (e.g., an aqueous base fluid) with a lubricant composition of this disclosure, and then using the wellbore fluid during wellbore operations (e.g., during a drilling or drill-in operation, a coiled tubing operation, a completions operation, etc.). The wellbore fluid may be a drilling fluid pumped down to the bottom of a well through a drill pipe, where the fluid emerges through ports in a drill bit, for example. The drilling fluid may be used in conjunction with any drilling operation for which it is suitable. Such drilling operations may include, without limitation, vertical drilling, extended reach drilling, and directional drilling. Water-based drilling muds having a variety of formulations may be prepared, with specific formulations depending on the state of drilling a well at a particular time, for example, depending on the particular formation being drilled and/or the depth. The drilling fluids described hereinabove may be adapted, for example, to provide enhanced water-based drilling muds for use under conditions of high temperature and/or pressure.

The lubricant compositions and wellbore fluids of the present disclosure may be prepared by any suitable means known in the art. In embodiments, the wellbore fluids may be prepared at a well site or at an offsite location. In embodiments, the lubricant composition may be formulated as an emulsion which is added to the wellbore fluid. Certain components of the wellbore fluid may be provided as a dry mix to be combined with fluid or other components prior to or during introducing the fluid into the well. Once prepared, a wellbore fluid of the present disclosure may be placed in a tank, bin, or other container for storage and/or transport to the site where it is to be used. In embodiments, a wellbore fluid of the present disclosure may be prepared on-site, for example, using continuous mixing, on-the-fly mixing, or real-time mixing methods. In embodiments, these methods of mixing may include methods of combining two or more components wherein a flowing stream of one element is continuously introduced into flowing stream of another component so that the streams are combined and mixed while continuing to flow as a single stream as part of the on-going treatment. The exemplary system depicted in FIG. 1 (described below) may represent system and equipment utilized to accomplish on-the-fly or real-time mixing, according to embodiments of this disclosure.

The wellbore fluids of the present disclosure may be prepared using any suitable method and/or equipment (e.g., blenders, mixers, stirrers, etc.) known in the art at any time prior to their use. The wellbore fluids may be prepared at a well site or at an offsite location.

The methods and compositions of the present disclosure may be used during or in conjunction with any operation in a portion of a subterranean formation and/or wellbore. In embodiments, the present disclosure provides methods and compositions for using the lubricant composition, wellbore fluids, and/or additional additives to carry out a variety of subterranean treatments, including but not limited to drilling operations, completions operations, coiled tubing operations, pre-flush treatments, after-flush treatments, hydraulic fracturing operations/treatments, sand control treatments (e.g., gravel packing operations), "frac pack" treatments, acidizing treatments (e.g., matrix acidizing or fracture acidizing), wellbore clean-out treatments, cementing operations, workover operations, and other operations where a wellbore fluid may be useful. Such wellbore fluids may include, but are not limited to, drilling fluids, preflush fluids, afterflush fluids, fracturing fluids, acidizing fluids, gravel packing fluids, packer fluids, spacer fluids, and the like. For example, the methods and/or compositions of the present disclosure may be used in the course of drilling operations in which a wellbore is drilled to penetrate a subterranean formation. In embodiments, this may be accomplished using the pumping system and equipment used to circulate the drilling fluid in the wellbore during the drilling operation, which is described below.

The wellbore fluids of the present disclosure may be provided and/or introduced into the wellbore or used to drill at least a portion of a wellbore in a subterranean formation using any method or equipment known in the art. In embodiments, a wellbore fluid of the present disclosure may be circulated in the wellbore using the same types of pumping systems and equipment at the surface that are used to introduce drilling fluids and/or other treatment fluids or additives into a wellbore penetrating at least a portion of the subterranean formation.

As noted hereinabove, in embodiments, a wellbore fluid including the herein described lubricant composition may be introduced into a subterranean formation. In embodiments, the subterranean formation may have a bottom hole temperature of from about 66° C. (150° F.) to about 204° C. (400° F.). In embodiments, the subterranean formation may have a bottom hole temperature of from about 93° C. (200° F.) to about 204° C. (400° F.). In embodiments, the subterranean formation may have a bottom hole temperature of from about 93° C. (200° F.) to about 177° C. (350° F.). In embodiments, the subterranean formation may have a bottom hole temperature of at least 177° C. (350° F.). In embodiments, the wellbore servicing fluid including the lubricant composition described herein may be used to drill at least a portion of a wellbore in the subterranean formation. In embodiments, the wellbore fluid may circulate through the wellbore while drilling into the subterranean formation. In embodiments, the wellbore fluid including the lubricant composition may be introduced into a wellbore that penetrates a subterranean formation.

In embodiments, the methods of the present disclosure may include foaming the wellbore fluid by incorporating air, nitrogen, an appropriate foamer, glass spheres, or any combination thereof into the fluid. In embodiments, the wellbore fluid may be introduced into the wellbore using one or more pumps. In embodiments, the lubricant composition, wellbore servicing fluids, and/or additional additives may be used in treating a portion of a subterranean formation, for example, in acidizing treatments such as matrix acidizing or fracture acidizing. In embodiments, the wellbore fluid including the lubricant composition may be introduced at a pressure sufficient to create or enhance one or more fractures within the subterranean formation (e.g., hydraulic fracturing).

In embodiments, the wellbore fluids of the present disclosure may be introduced into a subterranean formation, a wellbore penetrating a subterranean formation, tubing (e.g., pipeline), and/or a container using any suitable method or equipment. Introduction of the wellbore fluids of the present disclosure may in such embodiments include delivery via any of a tube, umbilical, pump, gravity, and combinations thereof, for example during coiled tubing operations, as described further hereinbelow with reference to FIG. 2. The wellbore fluids of the present disclosure may, in various embodiments, be delivered downhole (e.g., into the wellbore) or into top-side flowlines/pipelines or surface treating equipment.

For example, in embodiments, the lubricant composition, wellbore servicing fluids comprising the lubricant composition, and/or additional additives of the present disclosure may be introduced into a subterranean formation and/or wellbore using batch treatments, squeeze treatments, continuous treatments, and/or combinations thereof. In embodiments, a batch treatment may be performed in a subterranean formation by stopping production from the well and pumping a certain amount of the lubricant composition, wellbore servicing fluid comprising the lubricant composition, and/or additional additives into a wellbore, which may be performed at one or more points in time during the life of a well. In embodiments, a squeeze treatment may be performed by dissolving the lubricant composition, wellbore servicing fluids, and/or additional additives in a suitable solvent at a suitable concentration and squeezing that solvent carrying the lubricant or additional additives downhole into the formation, allowing production out of the formation to bring the lubricant composition and/or additional additives to the desired location.

In the methods and compositions of the present disclosure, the lubricant composition may be added to, or included in, a wellbore servicing fluid in any amount that may effectively increase the lubricity of a fluid to be treated to meet some user and/or process goal. In embodiments, an initial amount of lubricant composition may be added to a wellbore servicing fluid followed by subsequent, additional amounts. This technique may be used to increase and/or maintain a concentration of lubricant that may be sufficient to maintain a desired lubricity in a fluid to be treated throughout the course of a given operation.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary wellbore drilling assembly 100, according to one or more embodiments. As noted hereinabove, although FIG. 1 depicts a drilling system for use during a drilling operation, the herein disclosed lubricant compositions and wellbore fluids comprising same can be employed in a number of wellbore operations and systems not limited to drilling operations and systems. It should also be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed lubricant compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed lubricant composition may be added to the drilling fluid 122 at any other location in the drilling assembly 100. In embodiments, for example, there could be more than one retention pit 132, such as multiple retention pits 132 in series. Moreover, the retention pit 132 may be representative of one or more fluid storage facilities and/or units where the disclosed lubricant composition may be stored, reconditioned, and/or regulated until added to the drilling fluid 122.

As mentioned above, the disclosed compositions may directly or indirectly affect the components and equipment of the drilling assembly 100. For example, the disclosed compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods and compositions may directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids and additives, and any sensors (e.g., pressure, temperature, flow rate, etc.), gauges, and/or combinations thereof, and the like. The disclosed fluids may also directly or indirectly affect the mixing hopper 134 and the retention pit 132 and their assorted variations.

The disclosed methods and compositions also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods and compositions may also directly or indirectly affect any downhole heat exchangers, valves and corresponding actuation devices, tool seals, packers and other wellbore isolation devices or components, and the like associated with the wellbore 116. The disclosed methods and compositions may also directly or indirectly affect the drill bit 114, which may include, but is not limited to, roller cone bits, PDC bits, natural diamond bits, any hole openers, reamers, coring bits, etc.

The disclosed methods and compositions also may directly or indirectly affect the various equipment and/or tools (not shown) used at a well site or in drilling assembly 100 to detect various events, properties, and/or phenomena. Such equipment and/or tools may include, but are not limited to, pressure gauges, flow meters, sensors (e.g., float sensors used to monitor the level of drilling fluid in retention pit 132, downhole sensors, sensors in return flow line 130, etc.), seismic monitoring equipment, logging equipment, and the like.

While not specifically illustrated herein, the disclosed methods and compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (e.g., pressure and temperature), gauges, and/or combinations thereof, and the like.

Although depicted as a drilling system in FIG. 1, as noted hereinabove, the lubricant composition of this disclosure, and wellbore fluids comprising same, can be utilized in a variety of wellbore operations other than drilling, For example, the lubricant composition of this disclosure, and wellbore fluids comprising same, may be particularly amenable for use during completions operations. As also noted hereinabove, the lubricant composition of this disclosure, and wellbore fluids comprising same, may be particularly useful in coiled tubing operations in which a lubricant is utilized to enhance placement/positioning of the coiled tubing into and out of a borehole.

Coiled tubing generally refers to continuous, small diameter cylindrical tubing that is sufficiently flexible to be coiled onto a reel, for use in oil and gas service operations. Coiled tubing can be mounted on a truck or other support structure, such as a reel, for transporting to a work site. Coiled tubing may be used in a variety of oil and gas service operations, such as well or pipeline servicing operations, including drilling, completion, stimulation, cleaning, workover, well intervention, and other operations.

Coiled tubing may be used, for example, to inject or circulate gas or other fluids into the borehole or pipeline, to transport tools downhole (such as logging tools), to perform remedial cementing, clean-out, or circulation operations in the bore, to deliver and operate drilling and milling tools downhole, for electric wireline logging and perforating, fishing, setting and retrieving tools, for displacing fluids, and for transmitting hydraulic power into the borehole. The flexible, lightweight nature of coiled tubing makes it particularly useful in deviated boreholes, flowlines, pipelines and risers.

As used herein, the term piping refers to tubular conduct that is supplied in short lengths (typically 40 feet or less). The term tubing, as used herein, refers to tubular conduit that is supplied in long lengths (typically more than 100 feet) and that is stored and deployed from a reel.

A non-limiting example of a coiled tubing process that employs a lubricant within the wellbore casing is coiled-tubing drilling for subterranean oil-and-gas exploration.

In embodiments, the lubricant compositions of this disclosure is utilized during coiled tubing operations. The lubricant composition can be utilized as a lubricant during placement of the coiled tubing and/or can be utilized in a wellbore fluid introduced downhole via the positioned coiled tubing.

Using the lubricant composition in coiled-tubing applications can provide for improved coiled-tubing-process field performance relative to coiled-tubing methods that utilize known coiled-tubing lubricants. For example, using the lubricant composition of this disclosure in coiled tubing placement operations can, in embodiments, enable coiled tubing to travel greater distances within a wellbore casing relative to the distances that can currently be reached by using known coiled-tubing lubricants. Use of the lubricant composition of this disclosure in coiled tubing operations can, in embodiments, enable coiled tubing to travel distances within a wellbore casing that are 10-100, 20-100, 30-100, 40-100, or 50 to 110%, or at least 10, 20, 30, 40, 50, 60, 70, 80, 90, 100, 110, or 120% farther than the distances that can be reached by using known coiled-tubing lubricants. In embodiments, utilization of the herein disclosed lubricant composition in coiled tubing operations can enable coiled tubing to reach distances within a wellbore casing ranging from at least 10,000 feet to 25,000 feet or more. The relatively farther coiled tubing distances that can be achieved because of the use of the herein disclosed lubricant composition can be at least in part due to the increased friction reduction (relative to the friction reduction of known coiled-tubing lubricants) between a well bore-casing interior wall and the coiled tubing.

Compared to alternative coiled-tubing lubricants, the lubricant composition of this disclosure can be 50 to 100% (e.g., at least 50, 60, 70, 80, 90, or 100%) more effective in reducing friction generated by sliding steel against steel surfaces. The lubricant composition of this disclosure can enable friction reductions ranging from 40 to 55% or more in comparison with the 20 to 25% typically obtained with current commercial lubricants or additives.

In embodiments, the coiled-tubing fluid-lubricant composition embodiments reduce the friction generated by steel sliding against steel surfaces by at least 20, 30, 40, or 50% or more. In embodiments, the lubricant composition of this disclosure reduces the friction generated by steel sliding against steel surfaces by at least 45%. In embodiments, the lubricant composition of this disclosure reduces the friction generated by steel sliding against steel surfaces during coiled tubing operations by at least 50%.

The lubricant composition of this disclosure can be utilized in the same manner as that in which alternative coiled-tubing lubricants are utilized in coiled tubing operations. For example, in embodiments, the lubricant composition of this disclosure can be introduced into a wellbore casing in the same manner that alternative coiled-tubing lubricants are introduced into a wellbore casing. When conducting coiled-tubing methods or operations, useful amounts of the lubricant composition of this disclosure for use can be discovered with the help of this disclosure without having to exercise undue experimentation.

FIG. 2 is a well system 200, according to one or more embodiments. The exemplary well system 200 is utilized to produce hydrocarbons from borehole 202 extending through various earth strata in an oil and gas formation 204 located below the earth's surface 206. The borehole 202 may be formed of a single or multiple bores extending into the formation 204, and disposed in any orientation.

The well system 200 can utilize a coiled tubing system 208 to conduct various drilling, production, and/or well intervention operations. The coiled tubing system can include composite coiled tubing and/or metallic coiled tubing or piping. For example, the coiled tubing system 208 can comprise a hybrid coiled tubing system as described in U.S. Patent Publication No. 2021/0010346. The coiled tubing system 208 is stored on one or more reels 210 positioned near a wellhead 212. A tube guide 214 guides the coiled tubing of the hybrid coiled tubing system 208 into an injector 216 supported on a frame assembly 218 and positioned above the wellhead 212. The tube guide 214 is used to feed and direct the coiled tubing of the coiled tubing system 208 into and out of the borehole 202. The injector 216 and the frame assembly 218 may be suspended by a conventional derrick (not shown), a support frame (not shown), or a crane 220.0.

The coiled tubing of the hybrid coiled tubing system 208 can extend through a blowout preventer (BOP) stack 222 connected to the wellhead 212 for pressure control of the borehole 202. The BOP stack 212 may include one or more BOPs. Positioned atop the BOP stack 222 is a lubricator mechanism or one or more stuffing boxes 224, which provides the primary operational seal about the outer diameter of the coiled tubing of the hybrid coiled tubing system 208 for the retention of any pressure that may be present at or near the surface of the borehole 202. Although a land based well system 200 is depicted in FIG. 2, the coiled tubing system 208 can be deployed from floating rigs, jackups, platforms, subsea wellheads, or any other well location. Additionally, the coiled tubing system 208 can be deployed for use on a pipeline.

The lubricator 224, sometimes referred to as a lubricator tube or cylinder, can provide a method and apparatus whereby oilfield tools of virtually any length may be used in coiled or jointed tubing operations. In embodiments use of a lubricator allows the coiled tubing injector drive mechanism to be mounted directly on the wellhead. An oilfield tool of any length may be mounted within a closed-end, cylindrical lubricator which can be mounted on the BOP. Upon establishment of fluid communication between the injector and the BOP and wellhead by opening of a valve, the oilfield tool can be lowered from the lubricator into the wellbore with a portion of the tool remaining within the wellhead adjacent first seal rams located in the BOP which are then closed to engage and seal around the tool. The lubricator can then be removed and the injector head positioned above the BOP and wellhead. The tubing string can be extended to engage the captured tool and fluid and/or electrical communication can be established between the tubing and the tool. The injector drive mechanism, holding/attached to the tubing string) can then be connected to the BOP or wellhead and the first seal rams capturing the tool released and fluid communication established between the wellbore and the tubing injector drive head. The retrieval and removal of the oilfield tool components can be effected by performing the noted steps in reverse order.

A working or service fluid source 226, such as a storage tank or vessel, may supply a working fluid to the hybrid coiled tubing system 208. In particular, the fluid source 226 is in fluid communication with a fluid swivel 228 secured to reel 210 and in fluid communication with the interior of coiled tubing system 208. The fluid source 226 may supply any fluid utilized in well operations including, without limitation, drilling fluid, cement slurry, acidizing fluid, liquid water, steam, nitrogen, or some other type of fluid (which can be included generically herein as a "coiled tubing" fluid, which can also include lubricants comprising the lubricant composition of this disclosure utilized during positioning of coiled tubing downhole).

Various examples of fluids that may be provided by fluid source 226 and employed in the drilling, production, and well intervention operation described herein include air, water, oil, lubricant, friction reducer, natural gas, mist, foam, surfactant, nitrogen, various gases, drilling mud, acid, etc., or any combination thereof, which are flowed through the coiled tubing system 208 during a downhole operation. Moreover, the fluid source 226 may be in fluid communication with a pump (not shown) that pressurizes the working fluid at a select pressure, such as during high pressure pumping operation. The fluid source 226 may likewise be in communication with other surface equipment, such as mixers, blenders and the like, utilized to prepare fluids for pumping downhole via the fluid source 226. In embodiments, the fluid source 226 and/or surface equipment may be adjustable in real time responsive to communications during various well operations.

The well system 200 may also include a power supply 230 and a communications hub 232 for sending signals and/or power and otherwise controlling the well operations via electric and/or optic cable deployed within the coiled tubing system 208.

The well system 200 may include one or more casing strings 234 that may be cemented in borehole 202, such as surface, intermediate and production casings 234 shown in FIG. 2. An annulus 236 is formed between the walls of sets of adjacent tubular components, such as concentric casing strings 234 or the exterior of the coiled tubing system 208 and the inside wall 238 of borehole 202 or the casing string 234, as the case may be.

A bottom hole assembly (BHA) 240 may be suspended from the coiled tubing system 208. The well system 200 passes a fluid down the flowbore of the coiled tubing system 208 to the BHA 240. The return fluid will then pass up the annulus 236 formed between the coiled tubing system 208 and the casing string 234, completion string, or the borehole wall 238, if uncased. Fluids may also be pumped down the annulus 236 and return through the flowbore of the hybrid coiled tubing system 208. Fluids, cuttings and other debris returning to surface 206 from borehole 202 are directed by a flow line 242 to storage tanks 244 (or the fluid source 226) and/or processing systems 246, such as shakers, centrifuges and the like.

In embodiments, the lubricant composition of this disclosure is utilized in a coiled tubing operation: (i) as a lubricant utilized for positioning coiled tubing into or out of a borehole; (ii) as a component of a fluid introduced downhole via positioned coiled tubing; and/or (iii) as a lubricant for use during introduction of a tool downhole through coiled tubing positioned downhole, for example via a lubricator 224.

Embodiments of the present disclosure include a method comprising introducing a wellbore servicing fluid that includes a base fluid and a lubricant composition including at least one vegetable oil, a degreasing agent, and at least one non-ionic surfactant into at least a portion of a subterranean formation.

Embodiments of the present disclosure also include a lubricant composition comprising a lubricant composition that includes at least one vegetable oil, a degreasing agent, and at least one non-ionic surfactant.

Embodiments of the present disclosure also include a method comprising introducing a wellbore fluid that includes a divalent brine, a lubricant composition including at least one vegetable oil, a degreasing agent, and at least one non-ionic surfactant into at least a portion of a wellbore or subterranean formation; and using the wellbore fluid to perform a wellbore servicing operation; wherein a coefficient of friction of the wellbore fluid is lower than a fluid having an otherwise same composition as the wellbore fluid but absent the lubricant composition. The wellbore servicing operation can comprise a completions, drilling, or coiled tubing operation, in embodiments.

Embodiments of the present disclosure also include a method comprising introducing a wellbore fluid that includes a base fluid, a lubricant composition including at least one vegetable oil, a degreasing agent, and at least one non-ionic surfactant into at least a portion of a wellbore or subterranean formation, wherein a coefficient of friction of the wellbore fluid is lower than that of a fluid having a same composition as the wellbore fluid but absent the lubricant composition. Optionally in these embodiments or any other embodiments disclosed herein, the base fluid includes at least one component selected from: aqueous fluids, non-aqueous fluids, aqueous-miscible fluids, or a combination thereof. Optionally in these embodiments or any other embodiments disclosed herein, the base fluid includes at least one component selected from monovalent brines, divalent brines or a combination thereof. Optionally in these embodiments or any other embodiments disclosed herein, the base fluid includes a divalent brine. Optionally in these embodiments or any other embodiments disclosed herein, the at least one vegetable oil includes custard seed oil, almond oil, babassu oil, castor oil, clark A oil, avocado oil, apricot oil, coffee bean oil, coconut oil, corn oil, cotton seed oil, jojoba oil, mustard seed oil, olive oil, palm oil, peanut oil, safflower oil, sesame oil, soybean oil, sunflower seed oil, wheat germ oil rapeseed oil, meadowfoam oil, *lesquerella* oil, borage oil, evening primrose oil, palm kernel oil, canola oil, linseed oil, rice oil, or a combination thereof. Optionally in these embodiments or any other embodiments disclosed herein, the at least one vegetable oil includes soybean oil. Optionally in these embodiments or any other embodiments disclosed herein, the degreasing agent is selected from lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof. Optionally in these embodiments or any other embodiments disclosed herein, the degreasing agent comprises ethyl lactate. Optionally in these embodiments or any other embodiments disclosed herein, the at least one non-ionic surfactant is selected from linear alcohol polyethylene oxide ethers, polyethylene glycol (PEG) esters of fatty acids, sorbitan esters, polyethoxylated sorbitan esters, sorbitan monolaurate, sorbitan monopalmitate, sorbitan monostearate, sorbitan monooleate, sorbitan sesquioleate, sorbitan trioleate, sorbitan isostearate, polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, or a combination thereof. Optionally in these embodiments or any other embodiments disclosed herein, the at least one non-ionic surfactant comprises polyethoxylated sorbitan monooleate (e.g., TWEEN®-80 (Croda Americas L.L.C., Switzerland), polyethoxylated sorbitan monolaurate (e.g., TWEEN®-20 (Croda Americas L.L.C., Switzerland), or a combination thereof. Optionally in these embodiments or any other embodiments disclosed herein, the lubricant composition includes the at least one vegetable oil (e.g., soybean oil, degummed soybean) in an amount from about 50 wt % to about 90 wt % by total weight of the lubricant composition. Optionally in these embodiments or any other embodiments disclosed herein, the lubricant composition includes the degreasing agent (e.g., short chain ester, such as ethyl lactate) in an amount from about 0.1 wt % to about 25 wt % by total weight of the lubricant composition. Optionally in these embodiments or any other embodiments disclosed herein, the lubricant composition includes the non-ionic surfactant (e.g., polyethoxylated sorbitan monooleate, TWEEN®-80) in an amount from about 0.1 wt % to about 15 wt % by total weight of the lubricant composition. For example, in embodiments, the lubricant composition of this disclosure comprises from about 50 wt % to about 90 wt % by total weight of the lubricant composition of degummed soybean oil, from about 0.1 wt % to about 25 wt % by total weight of the lubricant composition of ethyl lactate, and from about 0.1 wt % to about 15 wt % by total weight of the lubricant composition of polyethoxylated sorbitan monooleate (e.g., TWEEN®-80).

Embodiments of the present disclosure include a composition including a lubricant composition that includes at least one vegetable oil, a degreasing agent, and at least one non-ionic surfactant, wherein the composition is a completions or coiled tubing fluid that includes a divalent brine.

Embodiments of the present disclosure also include a method comprising introducing a wellbore fluid that includes a divalent brine and a lubricant composition including at least one vegetable oil, a degreasing agent, and at least one non-ionic surfactant into at least a portion of subterranean formation; and using the wellbore fluid to service at least a portion of a wellbore penetrating at least a portion of the subterranean formation; wherein a coefficient of friction of the wellbore fluid is lower than a fluid having a same composition as the wellbore fluid but absent the lubricant composition, wherein the at least one vegetable oil includes soybean oil, and/or the degreasing agent comprises ethyl lactate.

In many embodiments, the advantages provided by a lubricant of this disclosure, and wellbore fluids and methods incorporating same, may include one or more of the following: the formation of stable and homogeneous emulsions; enhanced lubricity relative to that provided by conventional lubricants; improved compatibility with and/or solubility in a spectra of wellbore fluids (e.g., brine fluids, such as monovalent brines or divalent brines); reduced foaming, agglomeration, and/or precipitation relative to that seen with conventional lubricants; improved economics relative to conventional lubricants; compatibility with high solids contamination, demonstrating similar lubrication effects in the presence of solids, without the (amount and/or presence of) foaming and/or agglomeration often seen with conventional lubricants; compatibility with high oil contamination; compatibility with corrosion inhibitors; maintenance of lubrication performance with changes in pH values; stability at high temperatures, with maintenance of lubricity up to at least 350° F. (176.7° C.); excellent shelf life stability; and/or increased environmentally friendliness relative to some conventional lubricants, due to formulation with a vegetable oil.

In embodiments, a wellbore fluid of this disclosure reduces the coefficient of friction by at least 10, 20, 30, 40, or 50% or more relative to a same wellbore fluid absent lubricant composition. In embodiments, the FALEX reference load (described further in Example 4 hereinbelow) is increased at least about 10, 20, or 30% or more relative to the same wellbore fluid absent the lubricant composition. In embodiments, the wellbore fluid remains substantially homogeneous in the presence of at least about 25, 30, or 35 volume percent oil contamination or more. In embodiments, the wellbore fluid remains substantially homogeneous in the presence of up to at least about 30, 50, or 100 pounds or more per barrel (285 kg/m$^3$) of solids. In embodiments, the wellbore fluid is substantially stable up to at least 360° F. (182.2° C.).

A lubricant composition of this disclosure comprising vegetable (e.g., degummed soybean oil) as a lubricating aid, in combination with a degreasing agent (e.g., a short chain ester, such as ethyl lactate, which is highly soluble in degummed soybean oil), and a non-ionic surfactant, (e.g., such as TWEEN®-80) which can act as an emulsifier and help emulsify the lubricant composition with aqueous fluids can be prepared easily at low shear rates (e.g., less than or equal to about 1000, 900, 800, 700, 600, 500, 400, 300, or 200 rpm) and can be a stable and transparent liquid.

Use of bio-friendly ingredients, such as ethyl lactate as a degreasing agent in combination with a vegetable oil such as degummed soybean oil, can provide for an eco-friendly and cost-effective lubricant. The lubricant composition of this disclosure can be utilized, in embodiments, in high density brines for completion fluids; it can also be used for coil tubing applications at high temperature conditions (up to 300° F. and above). The disclosed lubricant composition can add an eco-friendly quotient, since the raw materials used in the lubricant formulation are biodegradable.

Via this disclosure degreasing agent(s), such as ethyl lactate, can be employed as degreasing agents for vegetable oil-based lubricants and utilized for water-based fluid applications, The invention having been generally described, the following Examples are given as particular embodiments of the invention and to demonstrate the practice and advantages thereof. It is to be understood that the Examples are given by way of illustration only, and are not intended to limit the specification or the claims to follow in any manner.

EXAMPLES

The embodiments having been generally described, the following examples are given as particular embodiments of the disclosure and to demonstrate the practice and advantages thereof. It is understood that the examples are given by way of illustration and is not intended to limit the specification or the claims in any manner.

Percentages set forth in the Examples (and the specification) are weight percentages except as otherwise indicated.

Lubricities (coefficients of friction) in these Examples were determined utilizing standard FANN® and FALEX lubricity meters. Coefficients of friction (CoF) in the hereinbelow Examples are FANN® readings, unless otherwise specified. FANN® lubricities (coefficients of friction) were determined using a FANN® Lubricity meter (Model 212), commercially available from FANN® Instrument Company. FALEX lubricities were determined utilizing a FALEX Lubricant Tester (manufactured by and commercially available from Faville-Le Vally Corporation of Bellwood, Ill.). The FALEX apparatus provides for the measurement of torque at increasing loads which are applied to a journal-V block assembly during prescribed time intervals.

Example 1

Hot Rolling Experiments

A lubricant composition, Lubricant Composition LC, of this disclosure was studied to evaluate its performance properties in a water-based fluid and highly concentrated divalent brines comprising 25.7 wt % and 35.6 wt % $CaCl_2$ brine. The composition of Lubricant Composition LC is shown in Table 1. The vegetable oil used in these Examples was a degummed soybean oil produced in the United States and obtained from Cargill.

TABLE 1

Exemplary Lubricant Composition LC

| Component | Function | Weight Percentage |
|---|---|---|
| Vegetable oil | Lubricating aid/providing boundary lubrication | 50-90% |
| Short chain ester | Degreasing agent | 0.1-25% |
| Non-Ionic Surfactant | Surfactant/Emulsifying agent | 0.1-15% |

The experimental data for this Example 1 is reported in Table 2 below.

The lubricity provided by a lubricant of this disclosure in a 10 ppg water based mud (WBM) was studied. The WBM comprised 60 ppb (pounds per barrel) NaCl, 0.3 ppb of a commercially available biocide (ALDACIDE® G biocide, available from Halliburton Energy Services in Houston, Texas), 0.75 ppb of a commercially available dispersant (BARAZAN® D PLUS, available from Halliburton Energy Services in Houston, Texas), 6 ppb of a commercially available filtration control additive (N-DRIL™ HT PLUS, available from Halliburton Energy Services in Houston, Texas), 0.75 ppb of a commercially available pH buffer (BARABUF®, available from Halliburton Energy Services in Houston, Texas), 15 ppb of a commercially available bridging agent (BARACARB® 5, available from Halliburton Energy Services in Houston, Texas), and 30 ppb of a commercially available bridging agent (BARACARB® 25, available from Halliburton Energy Services in Houston, Texas).

TABLE 2

Performance of Lubricant Composition in a 10 ppg WBM Fluid

| Products in order of addition | Unit | Mix Time | Mix 1 (Control) | | Mix 2 (Inventive) | |
|---|---|---|---|---|---|---|
| Water | lb/bbl | 5 | 308 (0.88 bbl) | | 308 (0.88 bbl) | |
| NaCl Salt | lb/bbl | 5 | 60 | | 60 | |
| BARAZAN ® D PLUS | lb/bbl | 10 | 0.75 | | 0.75 | |
| N-DRIL ™ HT PLUS | lb/bbl | 5 | 6 | | 6 | |
| BARABUF ® | lb/bbl | 2 | 0.75 | | 0.75 | |
| BARACARB ® 5 | lb/bbl | 5 | 15 | | 15 | |
| BARACARB ® 25 | lb/bbl | 5 | 30 | | 30 | |
| ALDACIDE G | lb/bbl | 2 | 0.3 | | 0.3 | |
| Lubricant Composition LC | lb/bbl | 5 | — | | 10.5 (3%) | |
| Aging Condition and Mixing Conditions | | | | | | |
| Mixing Quantity | | | 1 bbl | | 1 bbl | |
| Temperature | ° F. | | 250 | | 250 | |
| Time | h | | 16 | | 16 | |
| Aging Condition | | | Dynamic | | Dynamic | |
| Mixer Type | | | Multimixer | Multimixer | Multimixer | Multimixer |
| Mixer Speed | rpm | | 11500 | 11500 | 11500 | 11500 |
| FANN 35 Dial Readings at 120° F. | | | BHR | AHR | BHR | AHR |
| ⊖600 | | | 38 | 34 | 44 | 41 |
| ⊖300 | | | 27 | 24 | 31 | 29 |
| ⊖200 | | | 22 | 21 | 25 | 24 |
| ⊖100 | | | 16 | 16 | 19 | 19 |
| ⊖6 | | | 5 | 7 | 5 | 7 |
| ⊖3 | | | 4 | 6 | 4 | 6 |
| Plastic Viscosity | cP | | 17 | 10 | 13 | 12 |
| Yield Point | lb/100 ft² | | 10 | 14 | 18 | 17 |
| 10-second gel | lb/100 ft² | | 5 | 6 | 5 | 6 |
| 10-minute gel | lb/100 ft² | | 7 | 7 | 7 | 8 |
| pH | | | 9.7 | 8.7 | 9.2 | 8.5 |

Mix 1 is a control, while Mix 2 is an inventive composition comprising Lubricant Composition LC of this disclosure (Table 1). As seen in the results in Table 2, the fluid properties of Mix 2 were comparable to that of control fluid Mix 1. Mix 2 had marginally lower pH than the control fluid, Mix 1, before hot rolling (BHR), but, after hot roll (ATHR), the pH of Mix 2 was comparable with that of the control fluid Mix 1.

Lubricant Composition LC will not impact the WBM properties. The lubricity of the fluid was improved, e.g., the coefficient of friction was reduced by 26% as seen in Table 3 in Example 3, hereinbelow, which tabulates the results of the Fann Lubricity Testing.

Example 2

Performance of Lubricant Composition in Brine

In this Example 1, a Sample 1 comprising one barrel (bbl) of test fluid containing 25.7% $CaCl_2$) brine (10.3 ppg) and 3% of the Lubricant Composition LC and a Sample 2 comprising one barrel (bbl) of test fluid containing 35.6% $CaCl_2$ brine (11.2 ppg) and 3% of the Lubricant Composition LC were mixed on a multimixer and hot-rolled at 300° F. for 16 hours.

Both Sample 1 and Sample 2 were blended at low speed (200 rpm), at ambient temperature to obtain a homogeneous finished product. Both Sample 1 and Sample 2 were stable after hot rolling (AHR) for 16 hours at 300° F. and 200 psi $N_2$ pressure.

Sample 1 and Sample 2 were evaluated by the Cheese or Grease Test. Specifically, 3% of the Lubricant Composition LC was mixed with 1 barrel (bbl) of test brine solutions on a SILVERSON mixer for 5 minutes. The mixtures were then transferred to a clean glass container and observed for any layer separation or semi solids precipitate formation or excess foaming. After 30 minutes the appearance of the mixture was observed and reported for the "cheese or grease" tendency of the lubricant. Herein cheese refers to the formation of insoluble particulates, while grease refers to the formation of a separate oleaginous layer (e.g., phase separation) when the lubricant is mixed with a brine. Photographs were taken after 30 minutes post high shear mixing. These results are depicted in FIG. 3A-3D.

Figure 3A:
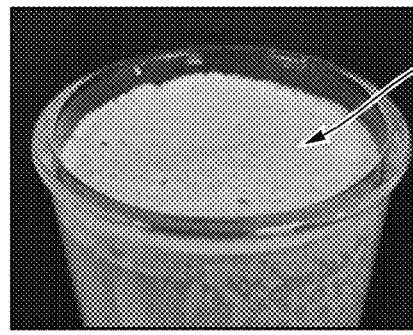
FIG. 3A depicts the results of lubricity testing for a Control 1 comprising 25.7% calcium chloride ($CaCl_2$) brine and 3% of a solution comprising 99.85% oil and 0.15% TWEEN®-80, without ethyl ester, as described further in Example 2.
Figure 3B:
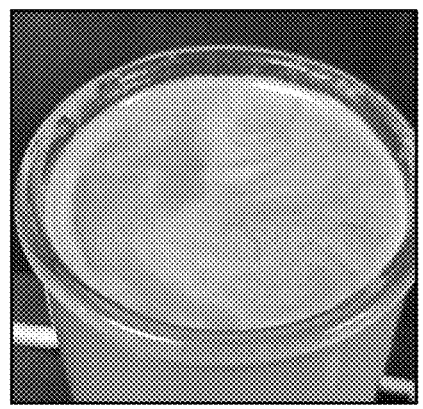
FIG. 3B depicts the glass liner top view from lubricity testing of a Sample 1 comprising 25.7% $CaCl_2$ brine and 3% of a Lubricant Composition LC of this disclosure, as described further in Example 2.
Figure 3C:
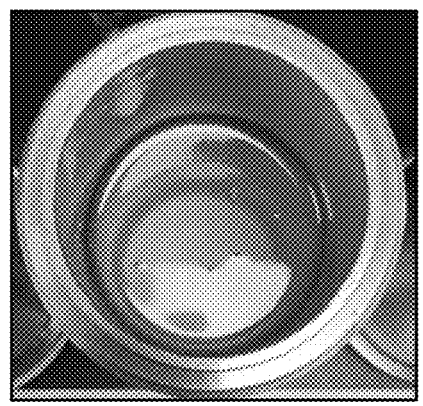
FIG. 3C depicts an aging cell top view from lubricity testing for Sample 1 comprising 25.7% $CaCl_2$ brine and 3% of the Lubricant Composition LC of this disclosure, as described further in Example 2.
Figure 3D:
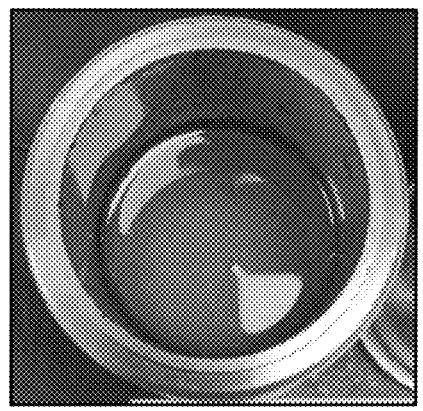
FIG. 3D depicts an aging cell top view from lubricity testing for a Sample 2 comprising 35.6% $CaCl_2$ brine and 3% of the Lubricant Composition LC of this disclosure, as described further in Example 2.

FIG. 3A is a picture of glass liner top view after hot rolling (AHR) at 300° F. for a Control 1 comprising 25.7 wt % $CaCl_2$ brine comprising 3% of a solution comprising 99.85% oil and 0.15% TWEEN®-80, without ethyl lactate; FIG. 3B is a picture of glass liner top view after hot rolling (AHR) at 300° F. for Sample 1 comprising 25.7 wt % $CaCl_2$ brine and 3% of the LC; FIG. 3C is a picture of an aging cell top view after hot rolling (AHR) at 300° F. for the Sample 1 comprising 25.7 wt % $CaCl_2$ brine and 3% of the Lubricant Composition LC; and FIG. 3D is a picture of an aging cell top view after hot rolling (AHR) at 300° F. for Sample 2 comprising 35.6 wt % $CaCl_2$ brine and 3% of the LC. The LC Lubricant Composition of this disclosure thus showed compatibility in high concentration brine, AHR (300° F.).

Figure 4:
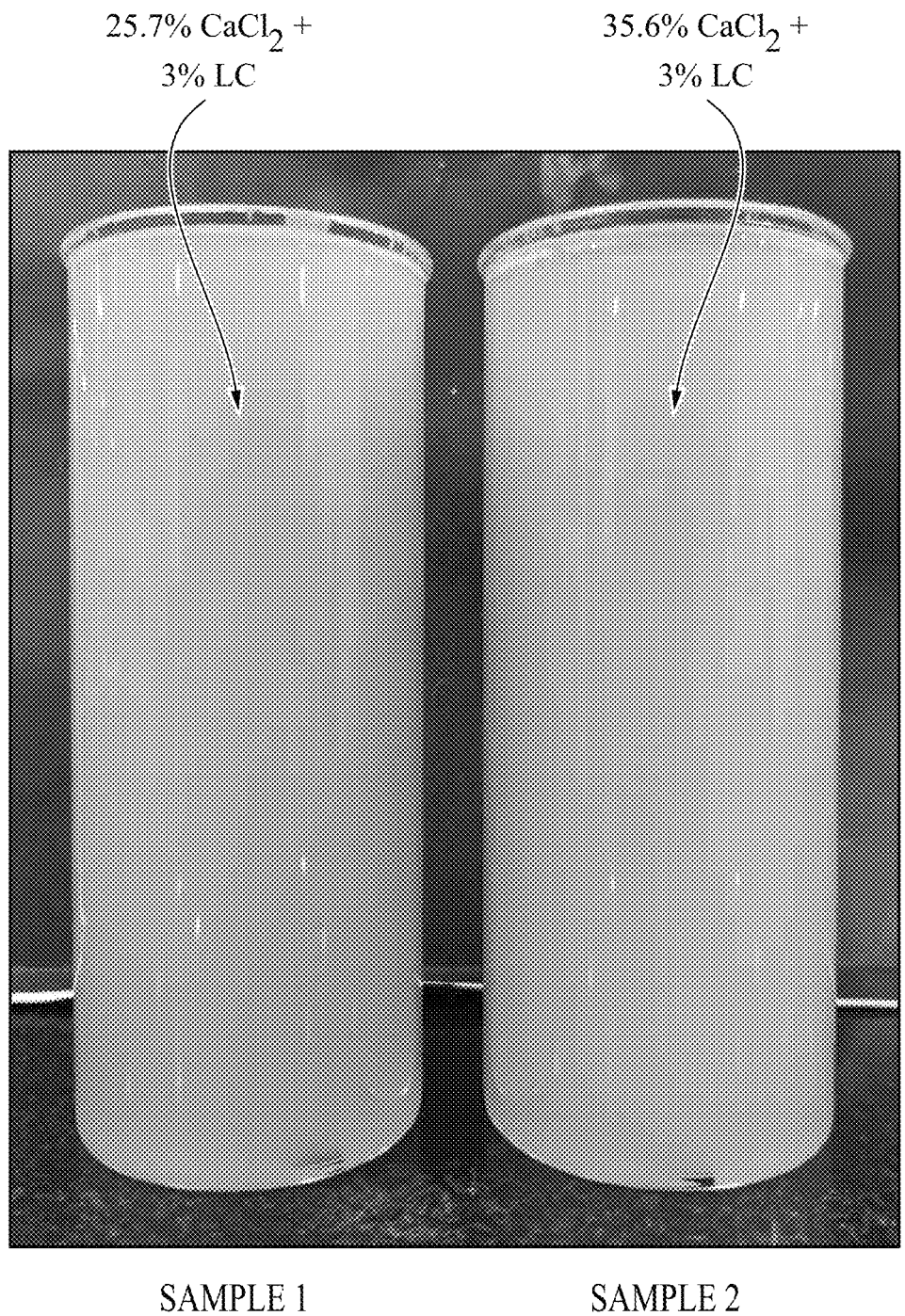
FIG. 4 depicts lubricant compatibility of samples comprising Sample 1 having 25.7% $CaCl_2$ brine and 3% of the Lubricant Composition LC of this disclosure (left panel) and Sample 2 having 35.6% calcium chloride ($CaCl_2$) brine and 3% of the Lubricant Composition LC of this disclosure (right panel), as described further in Example 2.

After sixteen hours of hot rolling the aging cells were allowed to cool and attain room temperature. The brine solutions (Sample 1 and Sample 2) were then mixed on a SILVERSON multimixer for five minutes at 6000 RPM and transferred into a glass liner and kept for 30 minutes to observe any foam, cheese or grease formation. After the 30 minutes, a glass liner picture was taken and recorded, as shown in FIG. 4, with the left panel depicting the image of Sample 1 and the right panel depicting the image of Sample 2. FIG. 4 depicts pictures of the glass liners containing Sample 1 and Sample 2, indicating the lubricant compatibility of samples comprising 25.7% $CaCl_2$ brine and 3% of Lubricant Composition LC of this disclosure (Sample 1; left panel) and 35.6% calcium chloride ($CaCl_2$) brine and 3% of a Lubricant Composition LC of this disclosure (Sample 2; right panel). It was observed that both the brine solutions did not show any cheese or grease forming tendency of the Lubricant Composition LC, indicating the lubricant compatibility in concentrated divalent brines. It was also noted that there was no excessive foam formation.

Example 3

Performance of Lubricant Composition in Brine and Water-Based Mud (WBM)

Sample 1 and Sample 2 comprising 25.7% and 35.6% $CaCl_2$ brine, respectively, and 3% of the Lubricant Composition LC of this disclosure and hot rolled at 300° F. for 16 hours were also studied using Fann lubricity meter. A Control 2 and a Control 3 comprising 25.7% and 35.6% $CaCl_2$) brine, and no lubricant composition were also studied for comparison. Fann lubricity of a 10 ppg WBM (from Table 1) was also studied to evaluate the Lubricant Composition LC. The water-based mud (WBM) was prepared and hot rolled at 250° F. as tabulated in Table 2. A Control 4 comprising the WBM and no lubricant composition (Mix 1) was also studied, for comparison with the Sample 3 comprising the WBM and the LC (Mix 2).

TABLE 3

Fann Lubricity Data for Divalent Brines and WBM

| Test Fluid | Coefficient of friction (CoF) | % CoF reduction |
|---|---|---|
| Control 2 (25.7 wt % $CaCl_2$ brine) | 0.195 | — |
| Sample 1 (25.7 wt % $CaCl_2$ + 3% LC) | 0.071 | 63.64 |
| Control 3 (35.6 wt % $CaCl_2$ brine) | 0.160 | — |
| Sample 2 (35.6 wt % $CaCl_2$ + 3% LC) | 0.080 | 50 |
| Control 4 (WBM) | 0.205 | — |
| Sample 3 (WBM + 3% LC) | 0.151 | 26 |

It was observed that, the Lubricant Composition LC of this disclosure showed substantial decrease in coefficient of friction. In the 25.7% $CaCl_2$ brine at 3% LC concentration of Sample 1, the CoF was reduced by 63.64% relative to Control 2 comprising 25.7 wt % $CaCl_2$) brine no LC, and in Sample 2 comprising 35.6% $CaCl_2$ brine and the Lubricant Composition LC, the CoF was reduced by 50% relative to the Control 3 comprising the 35.6 wt % $CaCl_2$ brine and no LC. The data suggests that LC can perform as a lubricant suitable for high salinity brines and it sustains high temperature at the same time. It was also observed that the presence of the LC in Sample 3 minimized the CoF of the WBM by 26% relative to the Control 4 comprising the WBM and no LC.

Example 4

FALEX Lubricity Experiments

The lubricity characteristics of lubricant compositions of the type disclosed herein were evaluated. The lubricity of the fluids including lubricant compositions of the type disclosed herein were evaluated on a FALEX Lubricant Tester with a Pin and Vee block and a 300 lb to 2250 lb reference load in accordance with test method. The Coefficient of Friction as a function of load using different brines with or without Lubricant Composition LC are presented in FIG. 5, FIG. 6, and FIG. 7.

Figure 5:
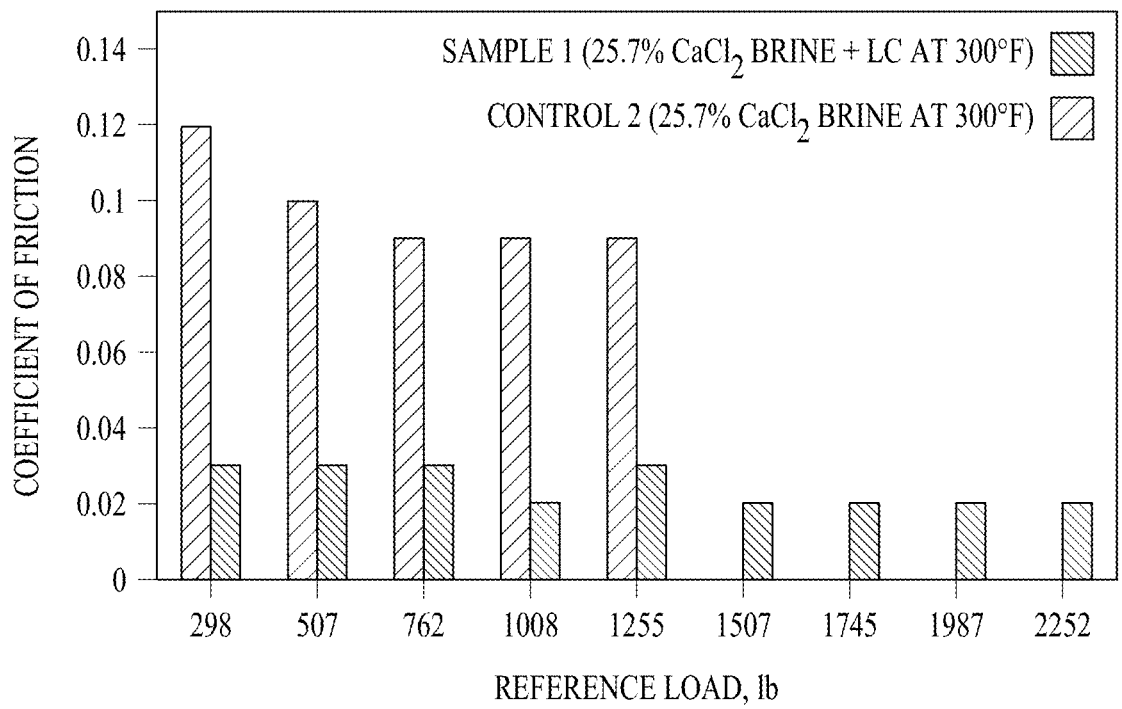
FIG. 5 is a plot of the coefficient of friction as a function of reference load for a Control 2 comprising 25.7% $CaCl_2$ brine and no lubricant and Sample 1 comprising 25.7% $CaCl_2$) brine and 3% of the Lubricant Composition LC of this disclosure, as further described in Example 4.
Figure 6:
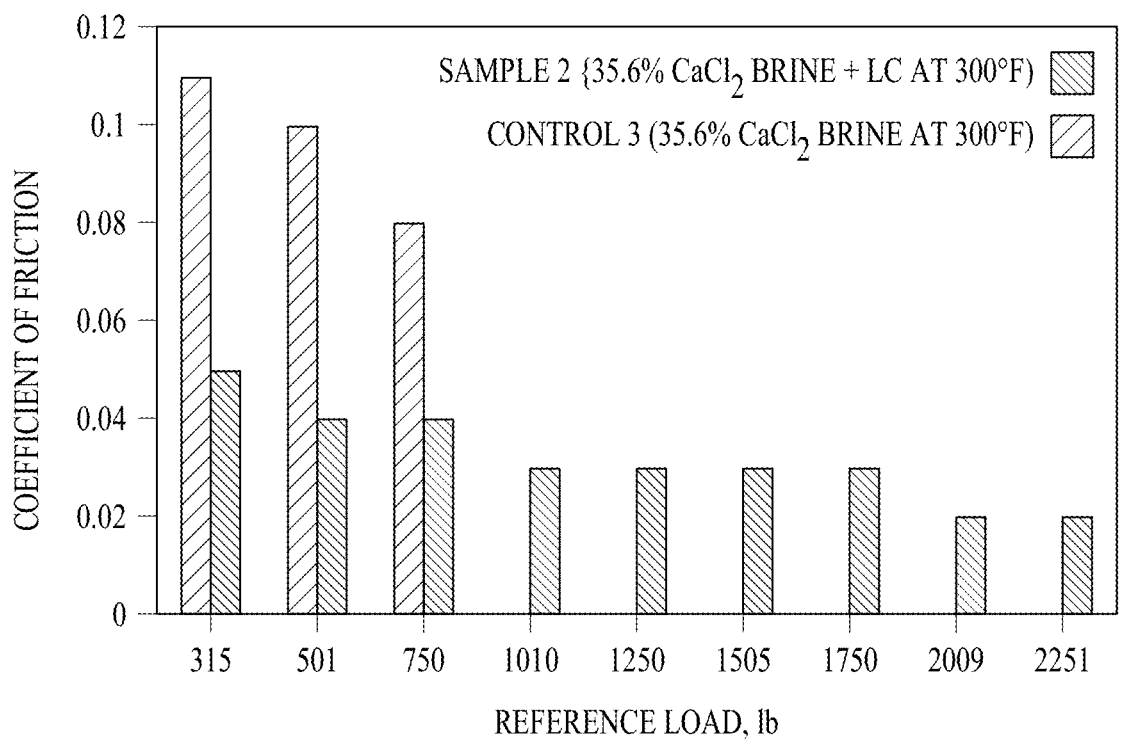
FIG. 6 is a plot of the coefficient of friction as a function of reference load for Control 3 comprising 35.6% $CaCl_2$ brine and no lubricant and Sample 2 comprising 35.6% $CaCl_2$ brine and 3% of the Lubricant Composition LC of this disclosure, as further described in Example 4.
Figure 7:
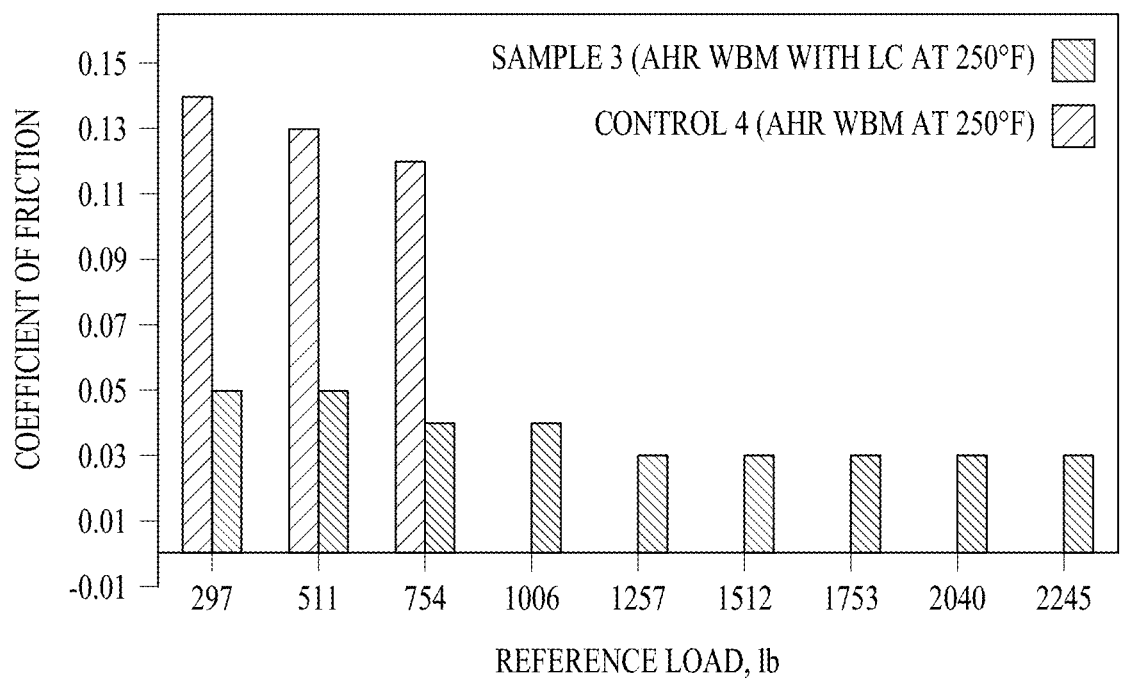
FIG. 7 is a plot of the coefficient of friction as a function of reference load for a Control 4 comprising a water-based mud (WBM) and no lubricant and Sample 3 comprising the WBM and 3% of the Lubricant Composition LC of this disclosure, as further described in Example 4.

Specifically, the 25.7% and 35.6% $CaCl_2$ brines absent or containing 3% Lubricant Composition LC of this disclosure and hot rolled at 300° F. for 16 hours were also studied using FALEX Lubricant Tester. The results are provided in FIG. 5, FIG. 6, and FIG. 7. FIG. 5 is a plot of the coefficient of friction as a function of reference load for Control 2 comprising 25.7% $CaCl_2$) brine and no lubricant and Sample 1 comprising 25.7% $CaCl_2$ brine and 3% Lubricating Composition LC; FIG. 6 is a plot of the coefficient of friction as a function of reference load for a Control 3 comprising 35.6% $CaCl_2$ brine and no lubricant and Sample 2 comprising 35.6% $CaCl_2$) brine and 3% of the Lubricant Composition LC; and FIG. 7 is a plot of the coefficient of friction as a function of reference load for Control 4 comprising the water-based mud (WBM) and no lubricant and Sample 3 comprising WBM and 3% of the Lubricant Composition LC. As seen in FIG. 5, Control 2 comprising $CaCl_2$ brine and no lubricant after hot rolling at 300° F. for 16 hours failed to perform after 1250 pound (lb) load on the FALEX Lubricant Tester. As seen in FIG. 6, the Control 3 comprising 35.6% $CaCl_2$ brine and no lubricant after hot rolling at 300° F. for 16 hours failed to perform after 750 lb load on the FALEX Lubricant Tester. As seen in FIG. 7, the Control 4 comprising WBM and no lubricant after hot rolling at 300° F. for 16 hours failed to perform after 750 lb load on the FALEX Lubricant Tester. The FALEX testing in all cases was carried out up to 2250 lb, not because the inventive Samples 1, 2, and 3 failed to maintain lubricity, but to prevent damage to the FALEX Lubricant Tester.

ADDITIONAL DISCLOSURE

The following are non-limiting, specific embodiments in accordance with the present disclosure:

In a first embodiment, a lubricant composition comprises: a vegetable oil; a degreasing agent; and a non-ionic surfactant.

A second embodiment can include the lubricant composition of the first embodiment, wherein the vegetable oil comprises custard seed oil, almond oil, babassu oil, castor oil, clark A oil, avocado oil, apricot oil, coffee bean oil, coconut oil, corn oil, cotton seed oil, jojoba oil, mustard seed oil, olive oil, palm oil, peanut oil, safflower oil, sesame oil, soybean oil, sunflower seed oil, wheat germ oil rapeseed oil, meadowfoam oil, *lesquerella* oil, borage oil, evening primrose oil, palm kernel oil, canola oil, linseed oil, rice oil, or a combination thereof.

A third embodiment can include the lubricant composition of the first or the second embodiment, wherein the vegetable oil comprises soybean oil.

A fourth embodiment can include the lubricant composition of any one of the first to third embodiments, wherein the vegetable oil comprises degummed soybean oil.

A fifth embodiment can include the lubricant composition of the fourth embodiment comprising from about 75 weight percent (wt %) to about 95 wt %, from about 50 wt % to about 90 wt %, from about 75 wt % to about 90 wt %, from about 80 wt % to about 90 wt %, or from about 80 wt % to about 95 wt % of the degummed soybean oil.

A sixth embodiment can include the lubricant composition of any one of the first to fifth embodiments, wherein the vegetable oil comprises a fatty acid selected from ricinoleic acid, oleic acid, linoleic acid, linolenic acid, stearic acid, palmitic acid, dihydroxystearic acid, octanoic acid, nonaoic acid, decanoic acid, lauric acid, myristic acid, and tricanoic acid, or a combination thereof.

A seventh embodiment can include the lubricant composition of any one of the first to sixth embodiments, wherein the vegetable oil is present in an amount of from about 75 weight percent (wt %) to about 95 wt %, from about 50 wt % to about 90 wt %, from about 75 wt % to about 90 wt %, from about 80 wt % to about 90 wt %, or from about 80 wt % to about 95 wt % based on a total weight of the lubricant composition.

An eighth embodiment can include the lubricant composition of any one of the first to seventh embodiments, wherein the degreasing agent comprises a reactive ester.

A ninth embodiment can include the lubricant composition of any one of the first to eighth embodiments, wherein the degreasing agent is selected from lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

A tenth embodiment can include the lubricant composition of any one of the first to ninth embodiments, wherein the non-ionic surfactant comprises a blend of at least two non-ionic surfactants.

An eleventh embodiment can include the lubricant composition of any one of the first to tenth embodiments, comprising from about 0.1 to about 25, from about 5 to about 25, from about 10 to about 20 percent, or from about 10 to about 15 percent of the degreasing agent.

A twelfth embodiment can include the lubricant composition of any one of the first to eleventh embodiments, wherein the non-ionic surfactant provides a hydrophilic-lipophilic balance (HLB) of from about 1 to about 10.

A thirteenth embodiment can include the lubricant composition of any one of the first to twelfth embodiments, wherein the non-ionic surfactant is selected from linear alcohol polyethylene oxide ethers, polyethylene glycol (PEG) esters of fatty acids, sorbitan esters, polyethoxylated sorbitan esters, sorbitan monolaurate, sorbitan monopalmitate, sorbitan monostearate, sorbitan monooleate, sorbitan sesquioleate, sorbitan trioleate, sorbitan isostearate, polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, or a combination thereof.

A fourteenth embodiment can include the lubricant composition of any one of the first to thirteenth embodiments, wherein the non-ionic surfactant is present in the lubricant composition in an amount of from about 0.1 to 15, from about 0.01 to 5, from about 0.01 to about 0.5, or from about 0.1 to about 0.2 wt % based on the total weight of the composition.

In a fifteenth embodiment, a wellbore fluid comprises a lubricant composition comprising a vegetable oil; a non-ionic surfactant; and a degreasing agent; and a base fluid.

A sixteenth embodiment can include the wellbore fluid of the fifteenth embodiment, wherein the wherein the base fluid is water-based.

A seventeenth embodiment can include the wellbore fluid of the fifteenth or sixteenth embodiment, wherein the base fluid comprises water and a salt.

An eighteenth embodiment can include the wellbore fluid of the seventeenth embodiment, wherein the salt comprises a monovalent salt.

A nineteenth embodiment can include the wellbore fluid of the seventeenth embodiment, wherein the salt comprises a divalent salt.

A twentieth embodiment can include the wellbore fluid of any one of the fifteenth to nineteenth embodiments, wherein the vegetable oil comprises wherein the vegetable oil comprises custard seed oil, almond oil, babassu oil, castor oil, clark A oil, avocado oil, apricot oil, coffee bean oil, coconut oil, corn oil, cotton seed oil, jojoba oil, mustard seed oil, olive oil, palm oil, peanut oil, safflower oil, sesame oil, soybean oil, sunflower seed oil, wheat germ oil rapeseed oil, meadowfoam oil, *lesquerella* oil, borage oil, evening primrose oil, palm kernel oil, canola oil, linseed oil, rice oil, or a combination thereof.

A twenty first embodiment can include the wellbore fluid of any one of the fifteenth to twentieth embodiments, wherein the degreasing agent is selected from lactic acid derivatives; esters that are water soluble or partially water soluble; formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

A twenty second embodiment can include the wellbore fluid of any one of the fifteenth to twenty first embodiments, comprising from about 0.5 to about 6, from about 1 to about 10, or from about 1 to about 5 weight percent of the lubricant composition.

A twenty third embodiment can include the wellbore fluid of any one of the fifteenth to the twenty second embodiments, wherein the lubricant composition comprises from about 50 to about 90, from about 75 to about 95, from about 75 to about 90, from about 80 to about 90, or from about 80 to about 95 weight percent (wt %) of the vegetable oil based on a total weight of the lubricant composition, from about 0.1 to about 25, from about 5 to about 25, from about 10 to about 20, or from about 10 to about 15 wt % of the degreasing agent based on the total weight of the lubricant composition, and from about 0.1 to 15, from about 0.01 to about 5, from about 0.01 to about 0.5, or from about 0.1 to about 0.2 wt % of the non-ionic surfactant based on the total weight of the lubricant composition.

A twenty fourth embodiment can include the wellbore fluid of any one of the fifteenth to twenty third embodiments, wherein the vegetable oil comprises degummed soybean oil.

In a twenty fifth embodiment, a method of servicing a wellbore comprises: introducing into a subterranean zone (e.g., into a wellbore disposed in a subterranean formation), a wellbore fluid comprising: a lubricant composition comprising a vegetable oil; a non-ionic surfactant; and a degreasing agent.

A twenty sixth embodiment can include the method of the twenty fifth embodiment, wherein the lubricant composition is introduced into the subterranean zone as a component of the wellbore fluid comprising the lubricant composition and a base fluid.

A twenty seventh embodiment can include the method of the twenty sixth embodiment, wherein the base fluid is selected from brines, invert emulsions or combinations thereof.

A twenty eighth embodiment can include the method of any one of the twenty fifth to twenty seventh embodiments, wherein the lubricant composition comprises from about 50 to about 90, from about 75 to about 95, from about 75 to about 90, from about 80 to about 90, or from about 80 to about 95 weight percent (wt %) of the vegetable oil based on a total weight of the lubricant composition, from about 0.1 to about 25, from about 5 to about 25, from about 10 to about 20, or from about 10 to about 15 wt % of the degreasing agent based on the total weight of the lubricant composition, and from about 0.1 to about 15, from about 0.01 to about 5, from about 0.01 to about 0.5, or from about 0.1 to about 0.2 wt % of the non-ionic surfactant based on the total weight of the lubricant composition.

A twenty ninth embodiment can include the method of any one of the twenty fifth to twenty eighth embodiments, wherein the non-ionic surfactant is selected to provide an HLB in the range of from about 12 to about 18, from about 13 to about 17, or from about 14 to about 16.

A thirtieth embodiment can include the method of any one of the twenty fifth to twenty ninth embodiments, wherein the vegetable oil comprises soybean oil.

A thirty first embodiment can include the method of any one of the twenty fifth to thirtieth embodiments, wherein the lubricant composition comprises more than one non-ionic surfactant.

A thirty second embodiment can include the method of any one of the twenty fifth to thirty first embodiments, wherein the non-ionic surfactant is selected from linear alcohol polyethylene oxide ethers, polyethylene glycol (PEG) esters of fatty acids, sorbitan esters, polyethoxylated sorbitan esters, sorbitan monolaurate, sorbitan monopalmitate, sorbitan monostearate, sorbitan monooleate, sorbitan sesquioleate, sorbitan trioleate, sorbitan isostearate, polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, or a combination thereof.

A thirty third embodiment can include the method of any one of the twenty fifth to thirty second embodiments, wherein the vegetable oil comprises degummed soybean oil, and/or wherein the degreasing agent comprises ethyl lactate.

A thirty fourth embodiment can include the method of any one of the twenty fifth to thirty second embodiments, wherein introducing the wellbore fluid into the subterranean zone comprises introducing the wellbore fluid into a wellbore disposed in a subterranean formation during a drilling, completions, or coiled tubing operation.

In a thirty fifth embodiment, a method for performing a coiled-tubing process comprises: performing a coiled-tubing operation using a lubricant composition that includes: a vegetable oil; a degreasing agent; and a non-ionic surfactant.

A thirty sixth embodiment can include the method of the thirty fifth embodiment, wherein the lubricant composition reduces the friction generated by steel sliding against steel surfaces by at least 30, 40, or 50%.

In a thirty seventh embodiment, a method for performing a coiled-tubing process comprises: introducing a lubricant composition into a subterranean wellbore casing, wherein the fluid-lubricant composition comprises: a vegetable oil; a degreasing agent; and a non-ionic surfactant.

A thirty eighth embodiment can include the method of the thirty seventh embodiment, wherein the lubricant composition reduces the friction generated by steel sliding against steel surfaces by at least 30, 40, or 50%.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore, the method comprising:
   introducing, into a subterranean zone, a wellbore fluid comprising:
   a lubricant composition comprising a vegetable oil comprising soybean oil; a non-ionic surfactant;
   and a degreasing agent comprising ethyl lactate;
      wherein the lubricant composition comprises from about 80 to about 95 weight percent (wt %) of the vegetable oil based on a total weight of the lubricant composition, from about 10 to about 15 wt % of the degreasing agent based on the total weight of the lubricant composition, and from about 0.1 to about 5 wt % of the non-ionic surfactant based on the total weight of the lubricant composition.

2. The method of claim 1, wherein the lubricant composition is introduced into the subterranean zone as a component of the wellbore fluid comprising the lubricant composition and a base fluid.

3. The method of claim 1, wherein the lubricant composition comprises from about 0.1 to about 0.5 wt % of the non-ionic surfactant based on the total weight of the lubricant composition.

4. The method of claim 1, wherein the vegetable oil further comprises an oil selected from the group consisting of custard seed oil, almond oil, babassu oil, castor oil, clark A oil, avocado oil, apricot oil, coffee bean oil, coconut oil, corn oil, cotton seed oil, jojoba oil, mustard seed oil, olive oil, palm oil, peanut oil, safflower oil, sesame oil, sunflower seed oil, wheat germ oil rapeseed oil, meadowfoam oil, *lesquerella* oil, borage oil, evening primrose oil, palm kernel oil, canola oil, linseed oil, rice oil, and combinations thereof.

5. The method of claim 1, wherein the non-ionic surfactant is selected from linear alcohol polyethylene oxide ethers, polyethylene glycol (PEG) esters of fatty acids, sorbitan esters, polyethoxylated sorbitan esters, sorbitan monolaurate, sorbitan monopalmitate, sorbitan monostearate, sorbitan monooleate, sorbitan sesquioleate, sorbitan trioleate, sorbitan isostearate, polyethylene glycol sorbitan monolaurate, polyethylene glycol sorbitan monopalmitate, polyethylene glycol sorbitan monostearate, polyethylene glycol sorbitan tristearate, polyethylene glycol sorbitan monooleate, or a combination thereof.

6. The method of claim 1, wherein the vegetable oil comprises degummed soybean oil.

7. The method of claim 1, wherein introducing the wellbore fluid into the subterranean zone comprises introducing the wellbore fluid into a wellbore disposed in a subterranean formation during a drilling, completions, or coiled tubing operation.

8. The method of claim 7, wherein the lubricant composition is introduced into the subterranean zone as a component of the wellbore fluid comprising the lubricant composition and a base fluid.

9. The method of claim 8, wherein the base fluid is water-based.

10. The method of claim 1, wherein the degreasing agent further comprises one or more selected from lactic acid derivatives, formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

11. The method of claim 1, wherein the wellbore fluid further comprises a base fluid, wherein the base fluid is selected from brines, invert emulsions or combinations thereof.

12. The method of claim 1, wherein the wellbore fluid comprises from about 1 to about 10 weight percent of the lubricant composition.

13. The method of claim 1, wherein the wellbore fluid comprises less than about 5 weight percent of the lubricant composition.

14. The method of claim 1 further comprising selecting the non-ionic surfactant to provide a desired hydrophilic-lipophilic balance (HLB).

15. The method of claim 1 further comprising selecting the non-ionic surfactant to provide a hydrophilic-lipophilic balance (HLB) of from about 1 to about 10, from about 12 to about 18, from about 13 to about 17, or from about 14 to about 16.

16. The method of claim 15, wherein introducing the wellbore fluid into the subterranean zone comprises introducing the wellbore fluid into a wellbore disposed in a subterranean formation during a drilling, completions, or coiled tubing operation.

17. The method of claim 16, wherein introducing the wellbore fluid into the subterranean zone comprises introducing the wellbore fluid into a wellbore disposed in a subterranean formation during the coiled tubing operation.

18. The method of claim 17, wherein the lubricant composition reduces the friction generated by steel sliding against steel surfaces by at least 30%.

19. The method of claim 1, wherein the lubricant composition comprises more than one non-ionic surfactant.

20. The method of claim 1, wherein the subterranean zone and/or the wellbore fluid comprises greater than or equal to about 10,000 ppm of salt per liter of water.

* * * * *